United States Patent [19]
Hansmann et al.

[11] Patent Number: 6,046,311
[45] Date of Patent: *Apr. 4, 2000

[54] WATER-SOLUBLE FIBER-REACTIVE DYES, PREPARATION THEREOF AND USE THEREOF

[75] Inventors: Wilfried Hansmann, Leverkusen; Hermann Henk, Köln; Stefan Ehrenberg, Frankfurt; Wolfram Reddig, Leverkusen, all of Germany

[73] Assignee: DyStar Textilfarben GmbH & Co. Deutschland KG, Frankfurt, Germany

[ * ] Notice: This patent is subject to a terminal disclaimer.

[21] Appl. No.: 09/044,509

[22] Filed: Mar. 19, 1998

[30] Foreign Application Priority Data

Mar. 21, 1997 [DE] Germany ............... 197 11 828

[51] Int. Cl.⁷ ............... C09B 62/008; C09B 62/245; C09B 62/085
[52] U.S. Cl. ............ 534/605; 534/618; 534/624; 534/633; 534/634; 540/125; 544/76; 544/189; 544/194
[58] Field of Search ............... 534/605, 618, 534/624, 633, 634; 540/125; 544/76, 189, 294

[56] References Cited

U.S. PATENT DOCUMENTS

| | | | |
|---|---|---|---|
| 5,270,454 | 12/1993 | Hoppe et al. | 534/634 X |
| 5,541,300 | 7/1996 | Bootz et al. | 534/634 X |
| 5,760,193 | 6/1998 | Russ et al. | 534/605 |

FOREIGN PATENT DOCUMENTS 0 774 493   5/1997   European Pat. Off. .

OTHER PUBLICATIONS

*Chemical Abstracts* vol. 127: 35959 (1997).

*Primary Examiner*—Fiona T. Powers
*Attorney, Agent, or Firm*—Connolly Bove Lodge & Hutz LLP

[57] ABSTRACT

Dyes containing a 5,6-difluoropyrimidin-4-yl radical as fiber-reactive group are useful for dyeing hydroxy- and/or carboxamido-containing material, including fiber material, for example cellulose fibers, wool and polyamide.

18 Claims, No Drawings

WATER-SOLUBLE FIBER-REACTIVE DYES, PREPARATION THEREOF AND USE THEREOF

DESCRIPTION

Water-soluble fiber-reactive dyes, preparation thereof and use thereof

This invention relates to the technical field of fiber-reactive dyes.

In the field of dyeing with fiber-reactive dyes, expectations with regard to the quality of the dyeings and the economics of the dyeing process are still rising, which is why there is a demand for novel fiber-reactive dyes having improved properties, not just good fastnesses, but also a high degree of fixation on the material to be dyed. For instance, U.S. Pat. Nos. 5,319,074, 5,340,928, 5,342,927 and 5,401,277 disclose fiber-reactive dyes containing a 2,4-difluoropyrimidin-6-yl radical as fiber-reactive component and a further fiber-reactive heterocyclic radical. These known dyes are in need of improvement, especially with regard to their degrees of fixation and the color strength of the dyeings and prints obtainable therewith, because of the risen expectations mentioned.

The present invention, then, provides novel fiber-reactive dyes having a 5,6-difluoropyrimidin-4-yl radical as fiber-reactive group, which conform to the below-defined general formula (1)

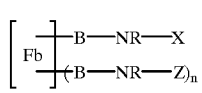

(1)

and are favorably distinguished from known dyes and afford dyeings and prints of high color strength.

In the formula (1):

Fb is the radical of a mono-, dis-, tris- or polyazo dye, of a 1:1 copper, 1:2 chromium or 1:2 cobalt complex mono-, dis- or trisazo dye, of an anthraquinone, phthalocyanine, metal phthalocyanine, such as copper phthalocyanine and nickel phthalocyanine, formazan, such as copper formazan, azomethine, dioxazine, triphendioxazine, phenazine, stilbene, triphenylmethane, xanthene, thioxanthone, nitroaryl, naphthoquinone, pyrenequinone or perylenetetracarbimide dye;

B is each, independently of the other one, a direct covalent bond or a bridge member which is attached to a ring carbon atom of an aromatic carbocyclic radical or to a ring carbon or nitrogen atom of an aromatic heterocyclic radical of Fb, preferably a direct covalent bond;

R is each, independently of the other one, hydrogen or alkyl of 1 to 6 carbon atoms, preferably alkyl of 1 to 4 carbon atoms, such as methyl and ethyl, optionally substituted, for example by substituents selected from the group consisting of halogen, hydroxy, carboxy, sulfo and sulfato, and is preferably methyl or ethyl or especially hydrogen;

X is the 5,6-difluoropyrimidin-4-yl group;

Z has the meaning of X or is another heterocyclic fiber-reactive radical;

n is 1 or 2, preferably 1.

In the foregoing general formula (1) and in the subsequent general formulae, the individual elements of the formulae, whether they bear identical or different designations within any one general formula, can have meanings under their definition which are mutually identical or different.

The terms sulfo, thiosulfato, carboxy, phosphato and sulfato cover not only the acid form but also the salt form of the respective groups, both in the above definitions and in what follows. Accordingly, sulfo groups are groups conforming to the general formula —SO$_3$M, thiosulfato groups are groups conforming to the general formula —S—SO$_3$M, carboxy groups are groups conforming to the general formula —COOM, phosphato groups are groups conforming to the general formula —OPO$_3$M$_2$ and sulfato groups are groups conforming to the general formula —OSO$_3$M, where each M is hydrogen or an alkali metal, such as sodium, potassium or lithium, or the mole equivalent of an alkaline earth metal, as of calcium, preferably hydrogen or an alkali metal.

Suitable bridge members B include for example those of the general formulae (a) to (l)

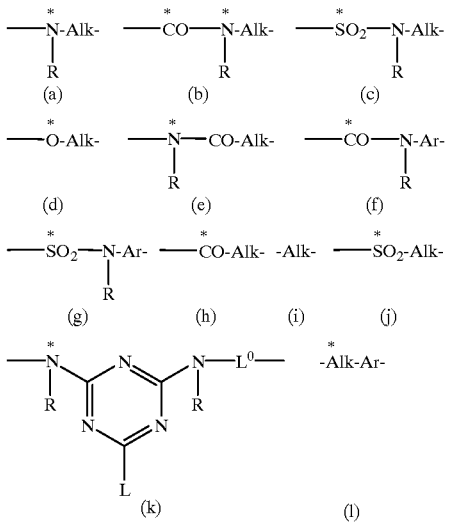

where the asterisk marks the site of attachment to Fb,

R is as defined in above,

Alk is alkylene of 1 to 6 carbon atoms or alkylene of 2 to 8, preferably 2 to 6, carbon atoms which is interrupted by 1 or 2 hetero groups, such as NH, N, O or S, or by 1 or 2 groupings containing 1, 2 or 3 hetero groups, Ar is phenylene or naphthylene or the radical of a biphenyl or stilbene, and Ar being unsubstituted or substituted in the aromatic nuclei, for example by substituents selected from the group consisting of fluorine, chlorine, bromine, alkyl of 1 to 4 carbon atoms, alkoxy of 1 to 4 carbon atoms, carboxy and sulfo, L° has the meaning of Alk or Ar or is a grouping of the formula

-Alk-Arwhere Alk and Ar are each as defined above, and

L is fluorine, chlorine, bromine, amino, which may be substituted, hydroxy, alkoxy of 1 to 4 carbon atoms, phenoxy, which may be substituted, or (C$_1$–C$_4$-alkyl) thio.

"Alkylene" here and below may be straight-chain or branched.

Suitable fiber-reactive radicals Z are in particular fiber-reactive radicals which contain at least one reactive substituent attached to a 5- or 6-membered aromatic heterocyclic ring, for example to a monoazine, diazine or triazine ring, especially a pyridine, pyrimidine, pyridazine, pyrazine, thiazine, oxazine or asymmetrical or symmetrical triazine ring, or to such a ring system that has one or more fused-on aromatic carbocyclic rings, for example a quinoline, phthalazine, cinnoline, quinazoline, quinoxaline, acridine, phenazine or phenanthridine ring system.

Examples of reactive substituents on the heterocycle include halogen (Cl, Br or F), ammonium including hydrazinium, pyridinium, picolinium, carboxypyridinium, sulfonium, sulfonyl, azido ($N_3$), thiocyanato, thioether, oxyether, sulfinic acid and sulfonic acid.

Z radicals are for example 2,4-difluorotriazin-6-yl, 2,4-dichlorotriazin-6-yl and monohalo-sym. triazinyl radicals, especially monochloro- and monofluorotriazinyl radicals, which are substituted by substituents selected from the group consisting of alkyl, aryl, amino, monoalkylamino, dialkylamino, aralkylamino, arylamino, morpholino, piperidino, pyrrolidino, piperazino, alkoxy, aryloxy, alkylthio and arylthio, where alkyl is preferably substituted or unsubstituted $C_1$–$C_4$-alkyl, aralkyl is preferably substituted or unsubstituted phenyl-$C_1$–$C_4$-alkyl and aryl is preferably substituted or unsubstituted phenyl or naphthyl and where preferred substituents for alkyl are halogen, hydroxy, cyano, vinylsulfonyl, substituted alkylsulfonyl, dialkylamino, morpholino, $C_1$–$C_4$-alkoxy, vinylsulfonyl-$C_2$–$C_4$-alkoxy, substituted alkylsulfonyl-$C_2$–$C_4$-alkoxy, carboxy, sulfo or sulfato and phenyl or naphthyl are sulfo, $C_1$–$C_4$-alkyl, $C_1$–$C_4$-alkoxy, carboxy, halogen, acylamino, vinylsulfonyl, substituted alkylsulfonyl, hydroxy and amino.

Specific examples of Z radicals are 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di(β-hydroxyethylamino)-4-fluorotriazin-6-yl, 2-β-sulfoethylamino-4-fluorotriazin-6-yl, 2-β-sulfoethylmethylamino-4-fluorotriazin-6-yl, 2-carboxymethylamino-4-fluorotriazin-6-yl, 2-di(carboxymethylamino)-4-fluorotriazin-6-yl, 2-sulfomethylmethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(4'-sulfobenzyl)amino-4-fluorotriazin-6-yl, 2-cyclohexylamino-4-fluorotriazin-6-yl, 2-(o-, m-, p-methylphenyl)amino-4-fluorotriazin-6-yl, 2-(o-, m-, p-sulfophenyl)amino-4-fluorotriazin-6-yl, 2-(2',5'-disulfophenyl)amino-4-fluorotriazin-6-yl, 2-(o-, m-, p-chlorophenyl)amino-4-fluorotriazin-6-yl, 2-(o-, m-, p-methoxyphenyl)amino-4-fluorotriazin-6-yl, 2-(2'-methyl-4'-sulfophenyl)amino-4-fluorotriazin-6-yl, 2-(2'-methyl-5'-sulfophenyl)amino-4-fluorotriazin-6-yl, 2-(2'-chloro-4'-sulfophenyl)amino-4-fluorotriazin-6-yl, 2-(2'-chloro-5'-sulfophenyl)amino-4-fluorotriazin-6-yl, 2-(2'-methoxy-4'-sulfophenyl)amino-4-fluorotriazin-6-yl, 2-(o-, m-, p-carboxyphenyl)amino-4-fluorotriazin-6-yl, 2-(2',4'-disulfophenyl)amino-4-fluorotriazin-6-yl, 2-(3',5'-disulfophenyl)amino-4-fluorotriazin-6-yl, 2-(2'-carboxy-4'-sulfophenyl)amino-4-fluorotriazin-6-yl, 2-(2'-carboxy-5'-sulopheny)amino- 4-fluorotriazin-6-yl, 2-(6'-sulfonaphth-2'-yl))amino-4-fluorotriazin-6-yl, 2-(4',8'-disulfonaphth-2'-yl)amino-4-fluorotriazin-6-yl, 2-(6',8'-disulfonaphth-2'-yl)amino-4-fluorotriazin-6-yl, 2-(N-methyl-N-phenyl)amino-4-fluorotriazin-6-yl, 2-(N-ethyl-N-phenyl)amino-4-fluorotriazin-6-yl, 2-(N-β-hydroxyethyl-N-phenyl)amino-4-fluorotriazin-6-yl, 2-(N-isopropyl-N-phenyl)amino-4-fluorotriazin-6-yl, 2-morpholino-4-fluorotriazin-6-yl, 2-piperidino-4-fluorotriazin-6-yl, 2-(4',6',8'-trisulfonaphth-2'-yl)amino-4-fluorotriazin-6-yl, 2-(3',6',8'-trisulfonaphth-2'-yl)amino-4-fluorotriazin-6-yl, 2-(3',6'-disulfonaphth -1'-yl)amino-4-fluorotriazin-6-yl, N-methyl-N-(2,4-dichlorotriazinyl)carbamyl, N-methyl-N-(2-methylamino-4-chlorotriazin-6-yl)carbamyl, N-methyl-N-(2-dimethylamino-4-chlorotriazin-6-yl)carbamyl, N-methyl- or N-ethyl-N-(2,4-dichlorotriazin-6-yl)aminoacetyl, 2-methoxy-4-fluorotriazin-6-yl, 2-ethoxy-4-fluorotriazin-6-yl, 2-phenoxy-4-fluorotriazin-6-yl, (2-(o-, m- or p-sulfophenoxy)-4-fluorotriazin-6-yl, 2-(o-, m- or p-methyl- or methoxyphenoxy)-4-fluorotriazin-6-yl, 2-β-hydroxyethylmercapto-4-fluorotriazin-6-yl, 2-phenylmercapto-4-fluorotriazin-6-yl, 2-(4'-methylphenyl)mercapto-4-fluorotriazinyl, 2-(2',4'-dinitrophenyl)mercapto-4-fluorotriazin-6-yl, 2-methyl-4-fluorotriazin-6-yl, 2-phenyl-4-fluorotriazin-6-yl and also the corresponding 4-chloro- or 4-bromo-triazinyl radicals and the corresponding radicals obtainable by halogen exchange with tertiary bases, such as trimethylamine, triethylamine, dimethyl-β-hydroxyethylamine, triethanolamine, N,N-dimethylhydrazine, pyridine, α-, β- or γ-picoline, nicotinic acid and isonicotinic acid, or with sulfinates, especially benzenesulfinic acid, or bisulfite.

The halotriazinyl radicals can also be linked to a second halotriazinyl radical or to a halodiazinyl radical or to one or more vinylsulfonyl or sulfatoethylsulfonyl radicals, for example via a bridge member of the formulae (m) to (o)

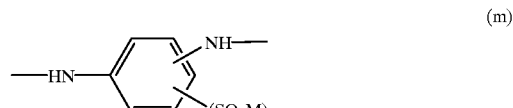

(m)

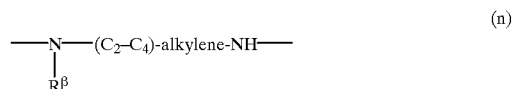

(n)

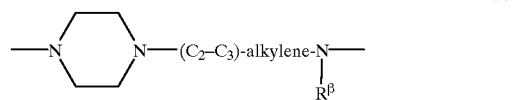

(o)

or in the case of a sulfatoethylsulfonyl or vinylsulfonyl group via a bridge member of the formulae (p) or (q)

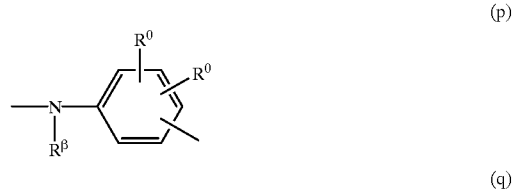

(p)

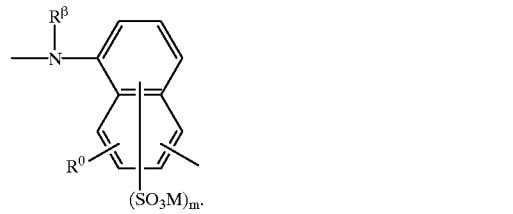

(q)

Further Z radicals are therefore for example groups of the general formulae (aa) to (ar)

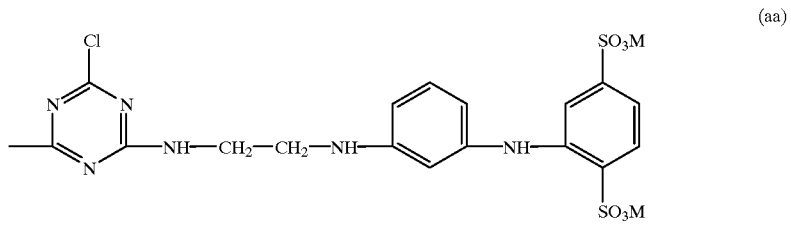
(aa)
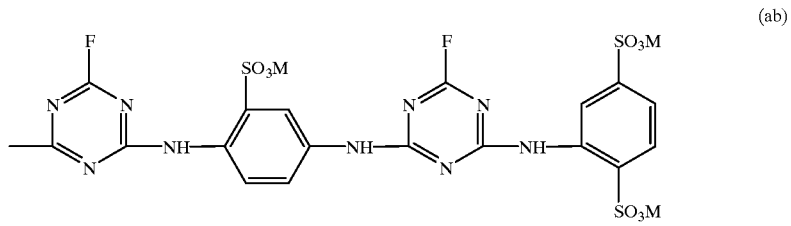
(ab)
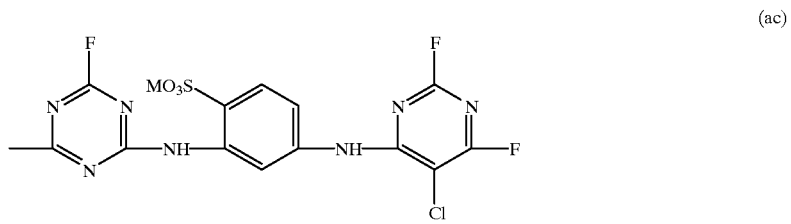
(ac)
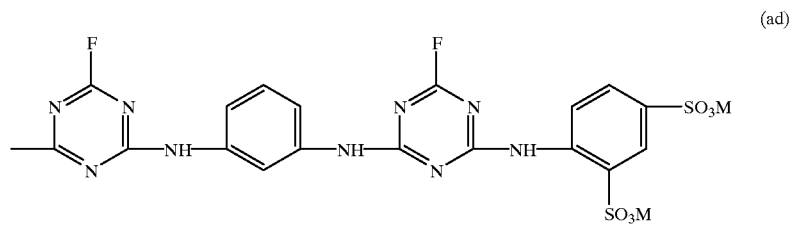
(ad)
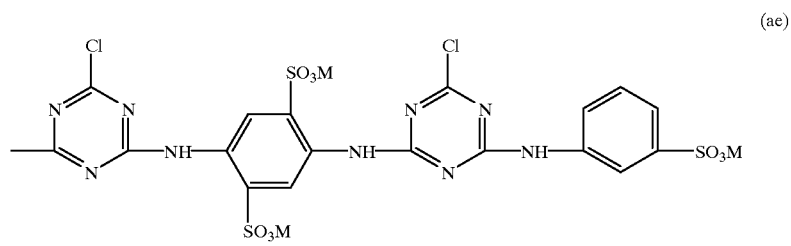
(ae)
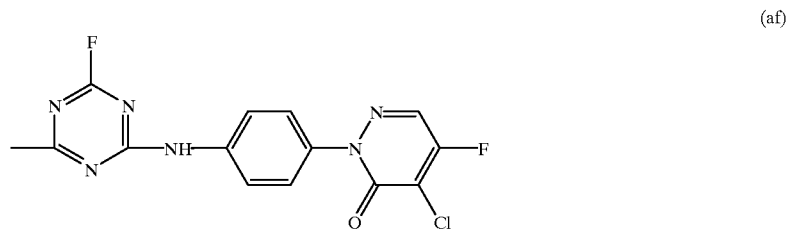
(af)
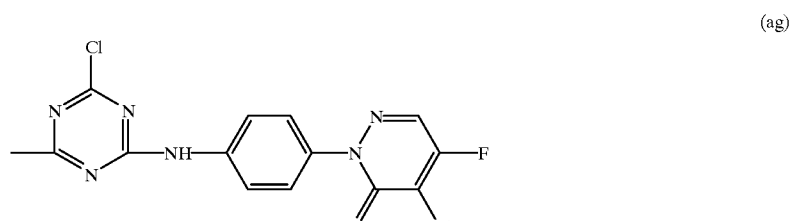
(ag)

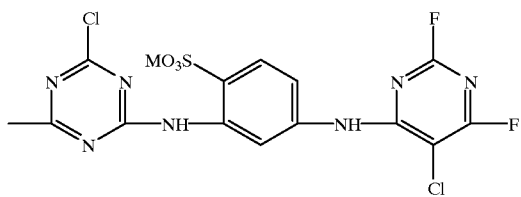 (ah)
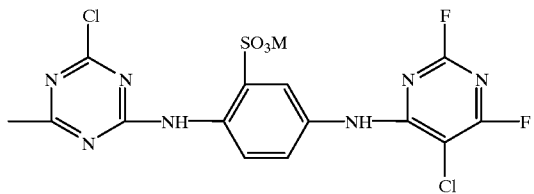 (ai)
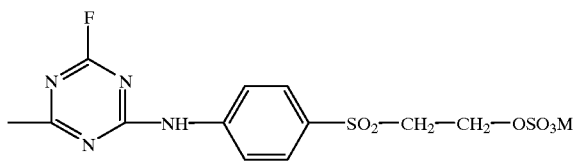 (aj)
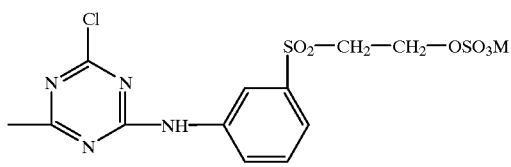 (ak)
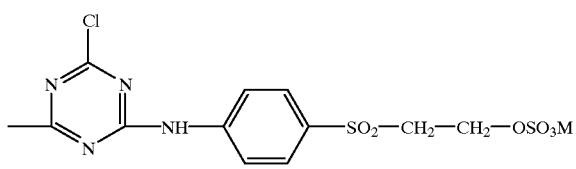 (am)
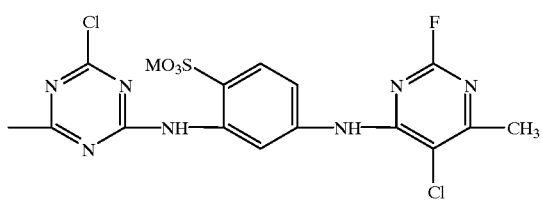 (an)
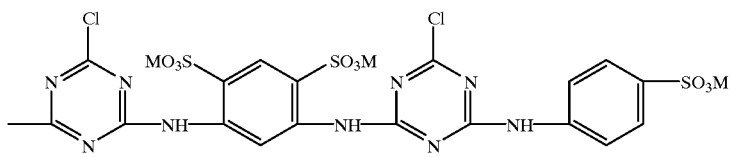 (ao)
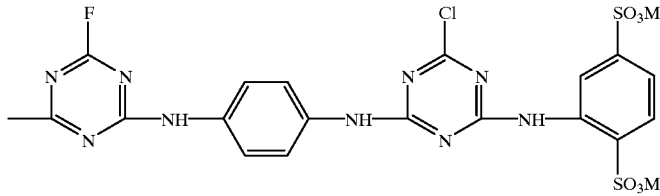 (ap)

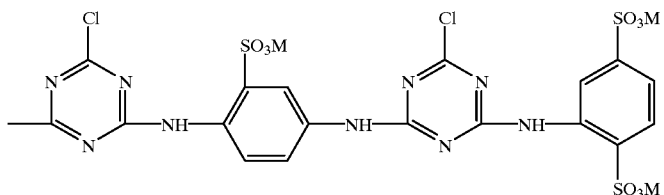

(aq)

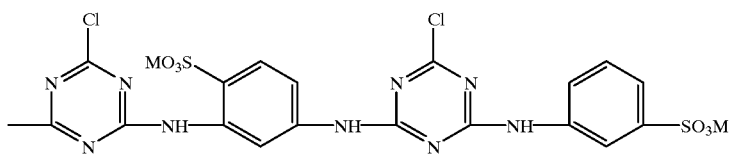

(ar)

where
M is as defined above,
R^β is hydrogen or alkyl of 1 to 4 carbon atoms, which may be substituted, for example by halogen, hydroxy, carboxy, sulfato or sulfo, and
R° is hydrogen, halogen, such as chlorine, fluorine and bromine, alkyl of 1 to 4 carbon atoms, such as ethyl and especially methyl, or alkoxy of 1 to 4 carbon atoms, such as ethoxy and especially methoxy.

Further Z radicals are for example 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carbalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5-or -6-carbonyl, 2,3-dichloroquinoxaline-5- or -6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloro-6'-pyridazon-1'-yl)phenyl-sulfonyl or -carbonyl, β-(4',5'-dichloro-6'-pyridazon-1'-yl)ethylcarbonyl, N-methyl-N-(2,3-dichloroquinoxaline -6-sulfonyl) aminoacetyl and N-methyl-N-(2,3-dichloroquinoxaline-6-carbonyl)aminoacetyl, and also the corresponding bromine and fluorine derivatives of the abovementioned chlorine-substituted heterocyclic radicals, including for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloropyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl- 5-chloro-2-fluoro-4-pyrimidinyl, 6-trifluoromethyl-2-fluoro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl-, 2-fluoro-6-phenyl-pyrimidinyl, 2-fluoro-6-cyano-4-pyrimidinyl, 5-chloro-6-fluoro-2-methyl-4-pyrimidinyl, 5,6-difluoro-4-pyrimidinyl, 5-chloro-6-fluoro-2-dichloro-fluoromethyl-4-pyrimidinyl, 2-fluoro-5-chloropyrimidin-4-yl, 2-methyl-4-fluoro-5-methylsulfonylpyrimidin-6-yl, 2,6-difluoro-5-methylsulfonyl-4-pyrimidinyl, 2,6-dichloro-5-methylsulfonyl-4-pyrimidinyl, 2-fluoro-5-sulfonamido-4-pyrimidinyl, 2-fluoro-5-chloro-6-carbomethoxy-4-pyrimidinyl and 2,6-difluoro-5-trifluoromethyl-4-pyrimidinyl, sulfonyl-containing triazine radicals, such as 2,4-bis(phenylsulfonyl)-6-triazinyl, 2-(3'-carboxyphenyl)-sulfonyl-4-chlorotriazin-6-yl, 2-(3'-sulfophenyl)sulfonyl-4-chlorotriazin-6-yl and 2,4-bis(3'-carboxyphenylsulfonyl)-6-triazinyl, sulfonyl-containing pyrimidine radicals, such as 2-carboxymethylsulfonylpyrimidin-4-yl, 2-methylsulfonyl-6-methylpyrimidinyl, 2-methylsulfonyl-6-ethylpyrimidin-4-yl, 2-phenylsulfonyl-5-chloro-6-methylpyrimidin-4-yl, 2,6-bismethylsulfonylpyrimidin-4-yl, 2,6-bismethylsulfonyl-5-chloropyrimidinyl, 2,4-bismethylsulfonylpyrimidine-5-sulfonyl, 2-methylsulfonylpyrimidin-4-yl, 2-phenylsulfonylpyrimidin-4-yl, 2-trichloromethylsulfonyl-6-methylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidin-5-sulfonyl-, 2-methylsulfonyl-5-nitro-6-methylpyrimidin-4-yl, 2,5,6-trismethylsulfonylpyrimidin-4- yl, 2-methylsulfonyl-5,6-dimethylpyrimidin-4-yl, 2-ethylsulfonyl-5-chloro-6-methylpyrimidin-4-yl, 2-methylsulfonyl-6-chloropyrimidin-4-yl, 2,6-bismethylsulfonylsulfonyl-5-chloropyrimidinyl, 2-methylsulfonyl-6-carboxypyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-9-sulfoethylsulfonyl-6-methyl-pyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2-methylsulfonyl-6-chloropyrimidin-4-yl and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl- or -carbonyl, 2-chlorobenzothiazole-5- or -6-carbonyl or -5- or -6-sulfonyl, 2-arylsulfonyl- or alkylsulfonyl-benzothiazole-5- or -6-carbonyl or -5- or -6-sulfonyl, such as 2-methylsulfonyl- or 2-ethylsulfonyl-benzothiazole-5- or -6-sulfonyl or -carbonyl, 2-phenylsulfonylbenzothiazole-5- or -6-sulfonyl or -carbonyl and the corresponding 2-sulfonylbenzothiazole-5- or -6-carbonyl or -sulfonyl derivatives which contain sulfo groups in the fused-on benzene ring, similarly, 2-chlorobenzoxazole-5- or -6-carbonyl or -sulfonyl, 2-chlorobenzimidazole-5- or -6-carbonyl or -sulfonyl, 2-chloro-1-methyl-benzimidazole-5- or -6-carbonyl- or -sulfonyl, 2-chloro-4-methyl-1,3-thiazole-5-carbonyl or -4- or -5-sulfonyl or the N-oxide of 4-chloro or 4-nitroquinoline-5-carbonyl.

Preference is given to dyes of the formula (1) where Fb is the radical of a mono- or disazo dye or of a metal complex azo dye. In these dyes, the radicals —B—N(R)—X and —B—N(R)—Z are attached to different or identical radicals of starting components, i.e., diazo and coupling components. Preferably, the radicals —B—N(R)—X and —B—N(R)—Z are attached to separate components, diazo component or coupling component. The dyes then conform for example to the formulae (1a), (1b), (1c) and (1d)

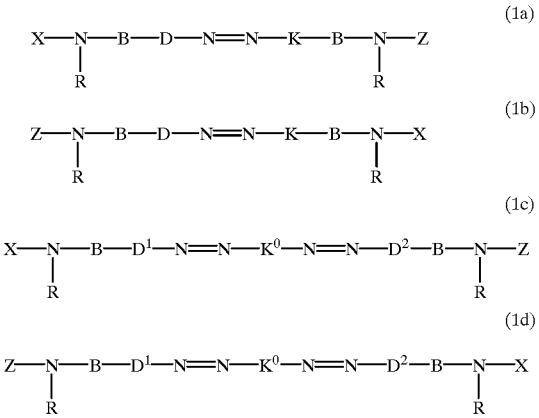

where

D, $D^1$ and $D^2$ are each the radical of a diazo component of the benzene or naphthalene series, K is the radical of a coupling component of the benzene, naphthalene, acetoacetarylide or heterocyclic series, within the heterocyclic series preferably a pyrazolone or pyridone radical, B is each identical to or different from the others and is as defined above, R is each identical to or different from the others and is as defined above, and $K^o$ is the radical of a doubly-coupling coupling component.

If the two radicals —B—N(R)—X and —B—N(R)—Z are attached to the same radical of a starting component D or K, this is especially the radical of a coupling component K. The dyes then conform to the formula (1e)

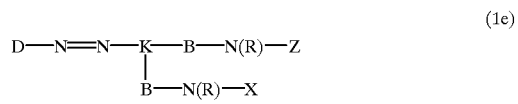

where D, K, B, R, X and Z are each as defined for the formulae (1a) to (1d).

The radicals D, $D^1$ and $D^2$ can be substituted by further azo groups or by radicals containing azo groups and similarly as recited above for the radical Fb of the formula (1), in which case X, Z, B and R are each as defined above.

Examples of D, $D^1$ and $D^2$ are preferably unsubstituted or sulfo-, chlorine-, $C_1$–$C_4$-alkyl-, carbalkoxy- or sulfonamido-substituted phenyl or phenylene, unsubstituted or sulfo-, chlorine-, $C_1$–$C_4$-alkoxy- or $C_1$–$C_4$-alkyl-substituted naphthyl or naphthylene, unsubstituted or sulfo-substituted 4-(phenylazo)phenyl and unsubstituted or sulfo-substituted biphenylene.

K is for example the radical of a coupling component of the hydroxybenzene, hydroxynaphthalene, aminobenzene, aminonaphthalene or aminohydroxynaphthalene series or a 5-hydroxy-3-methyl- or -carboxy-pyrazolone, a 6-hydroxy-2-pyridone or an unsubstituted or $C_1$-$C_4$-alkyl- or $C_1$–$C_4$-alkoxy-ring-substituted acetoacetarylide radical. The radical K can have the customary substitutents, especially sulfonic acid groups.

Further interesting dyes are those of the general formulae (1a) to (1e) where the radicals D, $D^1$, $D^2$ and K may additionally contain a further reactive radical. Tri- and tetrareactive dyes are thus encompassed as well, provided 5,6-difluoro-4-pyrimidinyl is at least one of the reactive radicals. The additional reactive radicals enclosed in D or K can - like Z and X - be attached via amino groups or in some other way, for example by a direct bond, to D or K. The above remarks apply mutatis mutandis also to the metal complexes of the mono- and disazo dye of the formulae (1) or (1a) to (1e).

Particular preference is given to novel dyes of the general formula (1) or (1a) to (1e) where Z is a radical of the general formula (2)

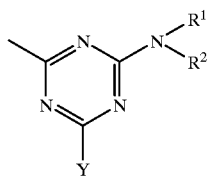

(2)

where

R$^1$ and R$^2$ are each independently of the other hydrogen or C$_1$–C$_4$-alkyl, optionally substituted, for example by substituents selected from the group consisting of halogen, cyano, C$_1$–C$_4$-alkoxy, hydroxy, carboxy, sulfo and sulfato, or benzyl, phenethyl, cyclohexyl, phenyl or a group of the formula —CH$_2$CH$_2$—SO$_2$—W, where W is vinyl or a group of the formula —CH$_2$—CH$_2$—V, where V is an alkali-eliminable radical, or is phenyl which may be substituted, for example by substituents selected from the group consisting of halogen, nitro, cyano, trifluoromethyl, sulfamoyl, carbamoyl, C$_1$–C$_4$-alkyl, C$_1$–C$_4$-alkoxy, C$_2$–C$_5$-alkanoylamino, benzoylamino, ureido, hydroxy, carboxy, sulfomethyl und sulfo, or is naphthyl which may be substituted, for example by substituents selected from the group consisting of halogen, nitro, C$_1$–C$_4$-alkoxy, C$_2$–C$_5$-alkanoylamino, hydroxy, carboxy and sulfo, or —NR$^1$R$^2$ is a morpholino, piperidino or piperazino group, and Y is chlorine, fluorine or a substituted or unsubstituted pyridinium radical.

Preference is given to dyes where Y is F. Of those where Y is Cl, preference is given to those in which —NR$^1$R$^2$ is as defined above, excluding sulfophenylamino, however.

Particular preference is further given to novel dyes where X and Z are both 5,6-difluoropyrimidin-4-yl.

Preference is further given to dyes of the general formula (1) where the radical —B—N(R)-Z is a radical of the general formula (2a)

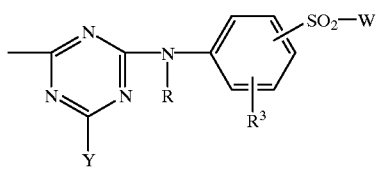

(2a)

where

Y is chlorine, fluorine, pyridinium or substituted or unsubstituted pyridinium, for example pyridinium substituted by alkyl of 1 to 4 carbon atoms, carboxy, sulfo, cyano or carbamoyl, W is vinyl or a group of the formula —CH$_2$—CH$_2$—V, where V is an alkali-eliminable radical, for example sulfato, thiosulfato, acetyloxy, phosphato, methylsulfonyloxy, ureido, methylsulfonylamino, chlorine, bromine, fluorine, benzoyloxy, phenylsulfonyloxy, whose phenyl radical may be substituted by a —[N(CH$_3$)$_3$]$^{(+)}$ anion $^{(-)}$ group or pyridinium which may be substituted, for example by alkyl of 1 to 4 carbon atoms, carboxy, sulfo, cyano or carbamoyl, and R$^3$ is hydrogen, chlorine, bromine, alkyl of 1 to 4 carbon atoms, alkoxy of 1 to 4 carbon atoms, carboxy or sulfo.

Preference is given to dyes of the general formulae (10) and (11)

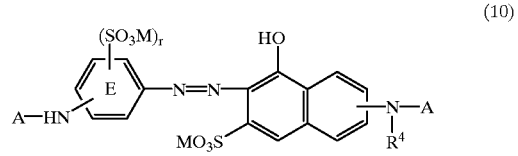

(10)

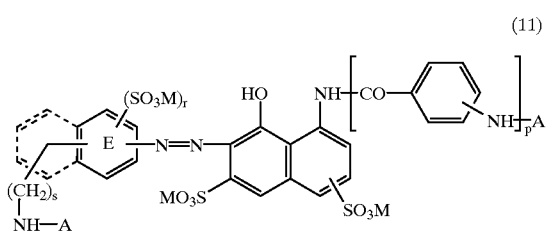

(11)

where

M is as defined above, each A is X or one A is X and the other A is Z, X and Z each being as defined above, R$^4$ is hydrogen, methyl or ethyl, the benzene ring E may be further substituted, r is 1 or 2, s is zero or 1, and p is zero or 1, and the benzene ring E in the formulae (10) and (11) is preferably not further substituted.

Preference is further given to dyes of the general formula (12)

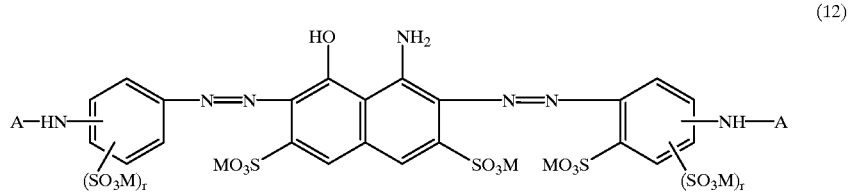

(12)

where M, A and r are each as defined above.
As well as the above-described dyes of the formulae (10), (11) and (12), useful dyes of the invention further include those of the general formulae (13) to (42):
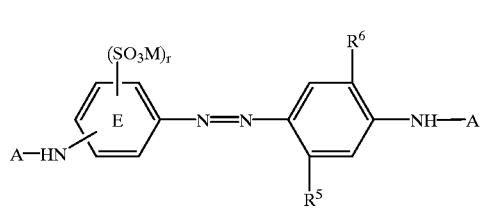
(13)
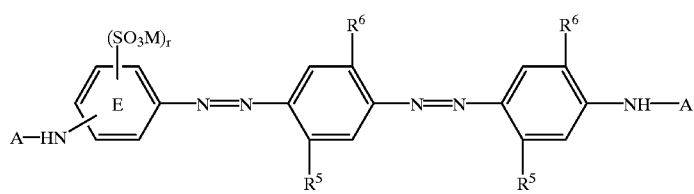
(14)
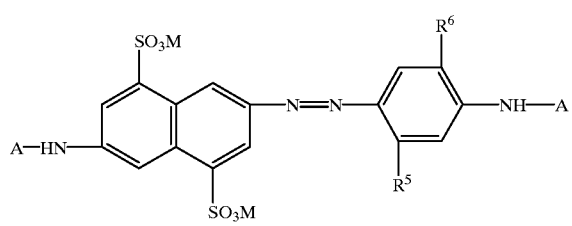
(15)
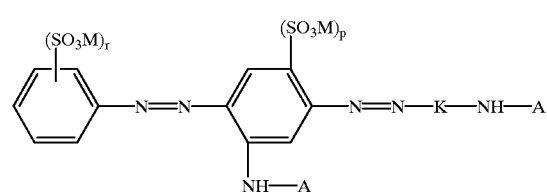
(16)
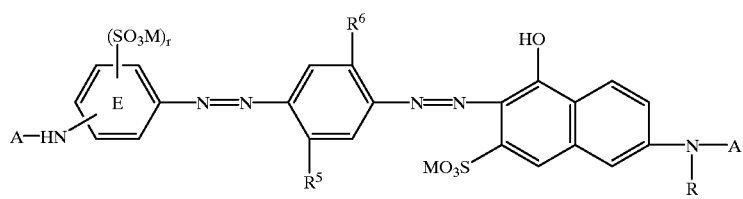
(17)
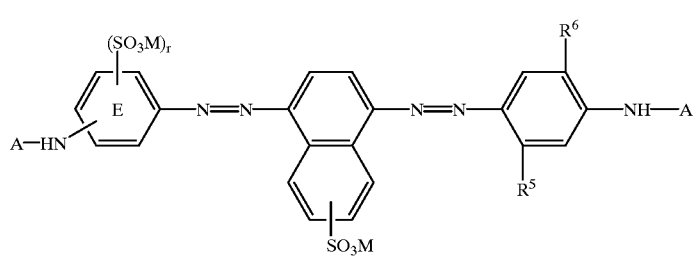
(18)
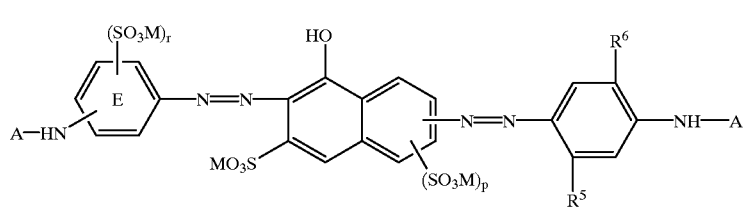
(19)

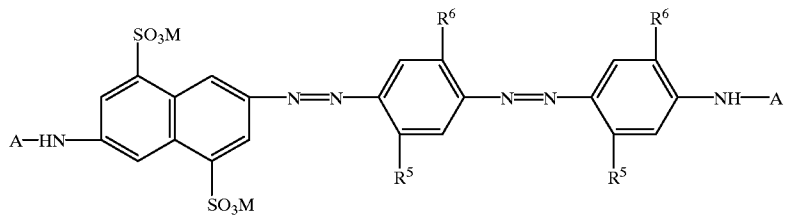
(20)
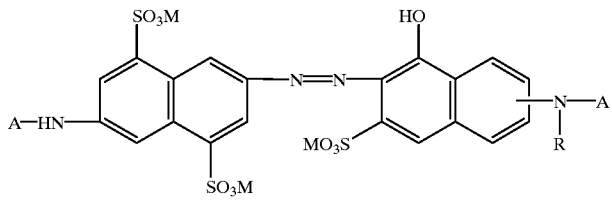
(21)
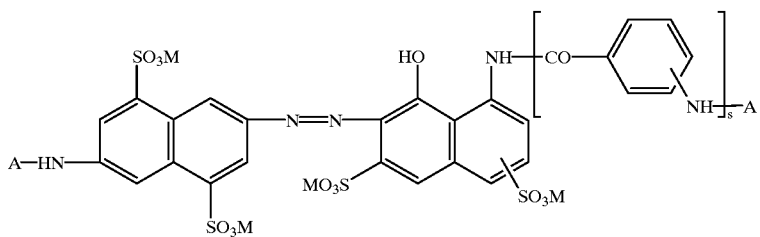
(22)
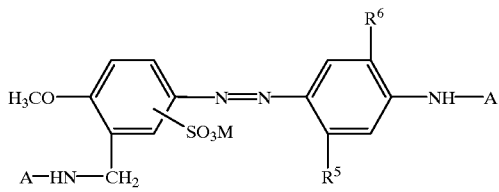
(23)
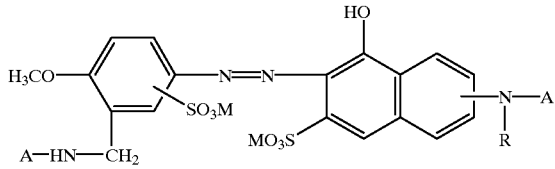
(24)
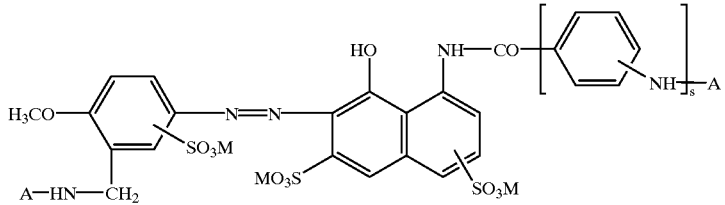
(25)
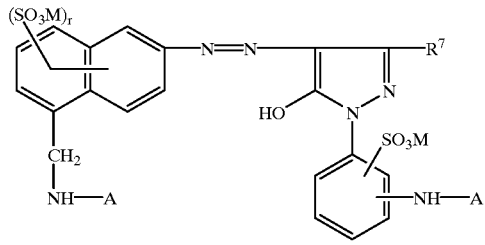
(26)

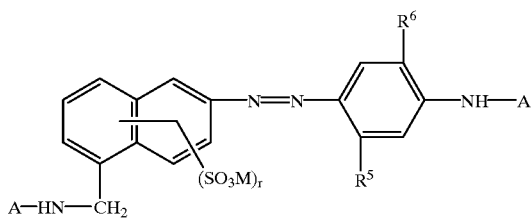
(27)
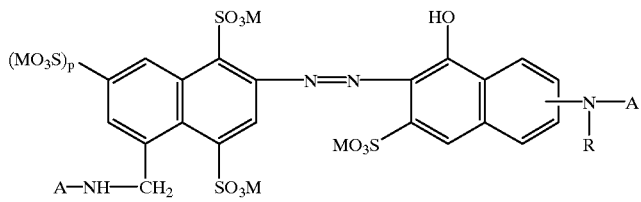
(28)
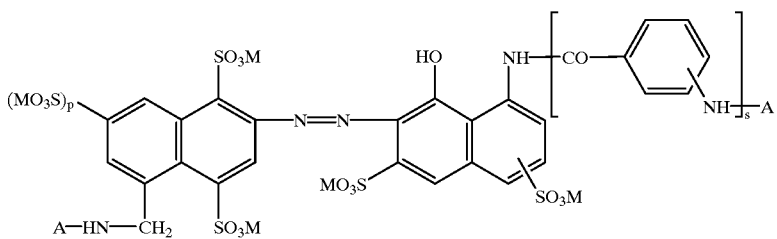
(29)
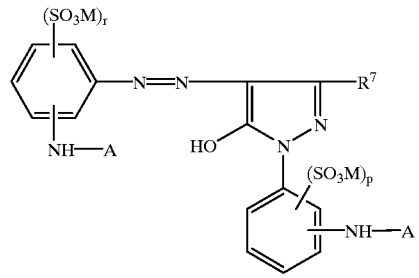
(30)
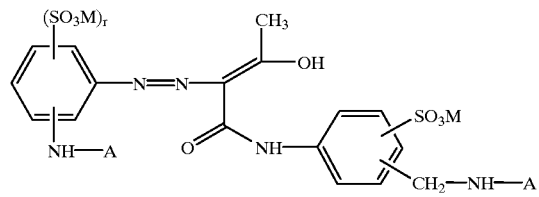
(31)
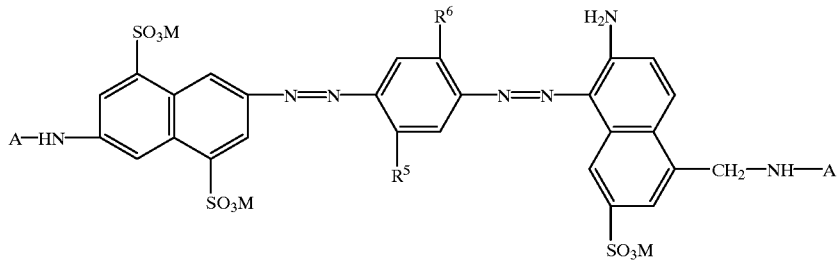
(32)

-continued
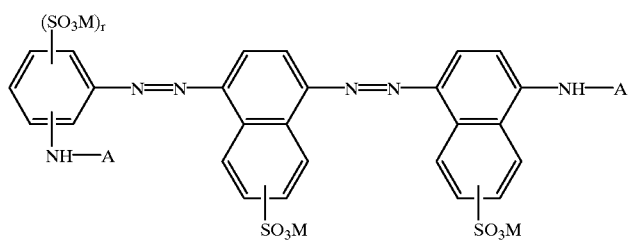
(33)
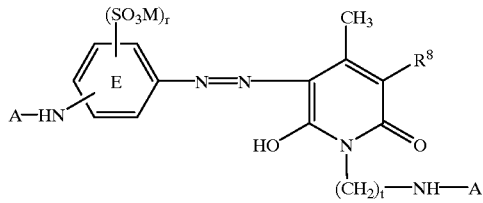
(34)
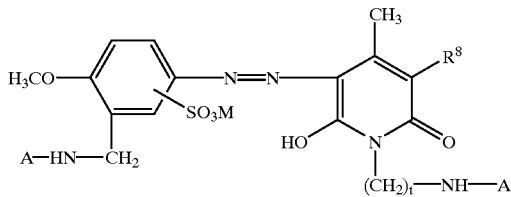
(35)
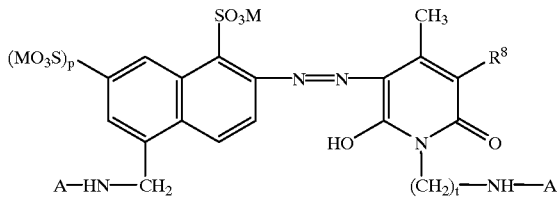
(36)
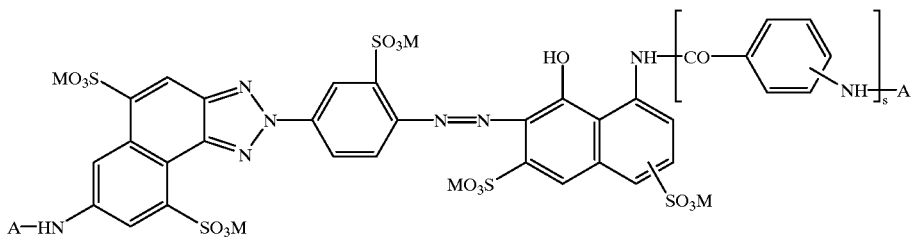
(37)
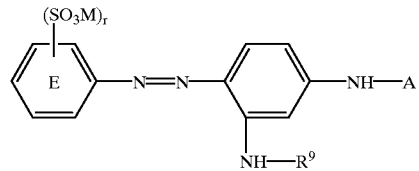
(38)
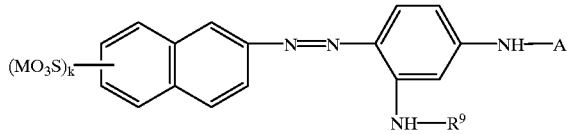
(39)

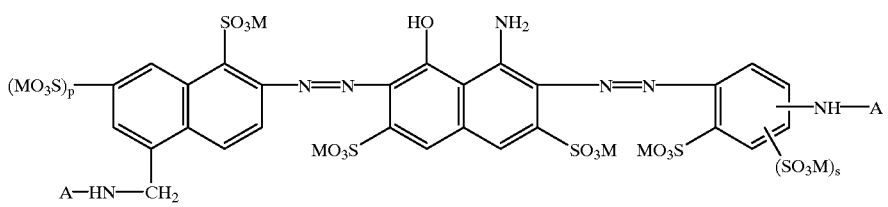
(40)

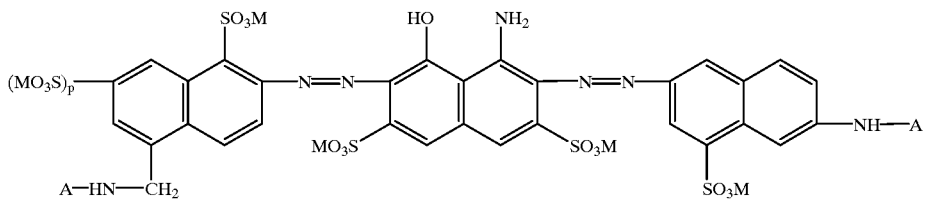
(41)

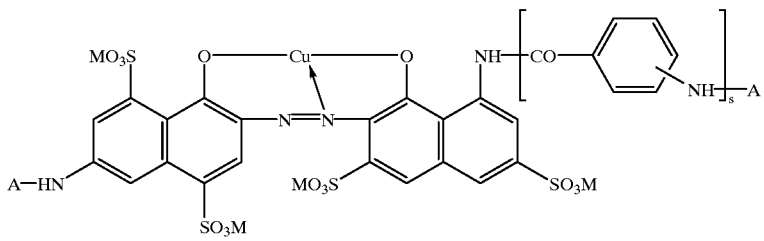
(42)

where

A, M, R, K, E, p, r and s are each as defined above, $R^5$ is hydrogen, alkyl of 1 to 4 carbon atoms, such as methyl and ethyl, alkoxy of 1 to 4 carbon atoms, such as methoxy and ethoxy, alkanoylamino of 2 to 5 carbon atoms, such as propionylamino and acetylamino, $C_1$–$C_4$-alkylsulfonylamino, aminocarbonylamino, chlorine, bromine or substituted or unsubstituted phenylcarbonylamino, $R^7$ is hydrogen, alkyl of 1 to 4 carbon atoms such as methyl and ethyl, alkoxy of 1 to 4 carbon atoms such as methoxy and ethoxy, hydroxy or sulfo, $R^8$ is methyl or carboxy, $R^9$ is alkanoyl of 2 to 4 carbon atoms such as propionyl and acetyl, or is aminocarbonyl, $R^9$ is cyano, aminocarbonyl, sulfomethyl, sulfo or hydrogen, t is 2 or 3, k is 1, 2 or 3, and the positionally unspecified —$SO_3M$ group in the formulae (22), (25), (29) and (37) is attached to the 8-hydroxynaphthalene radical in position 3 or 4, furthermore dyes of the general formula (43) and of the general formula (44)

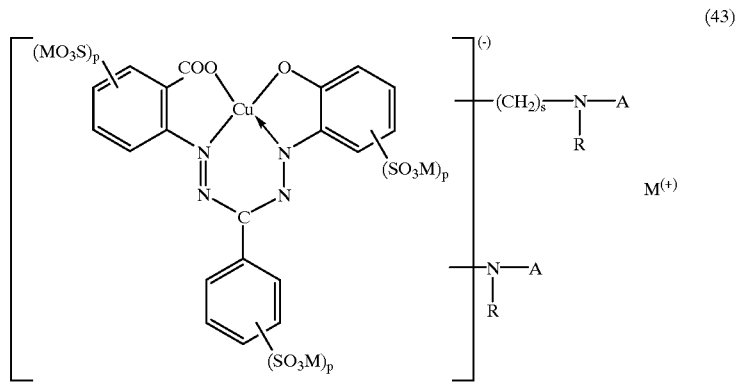
(43)

-continued

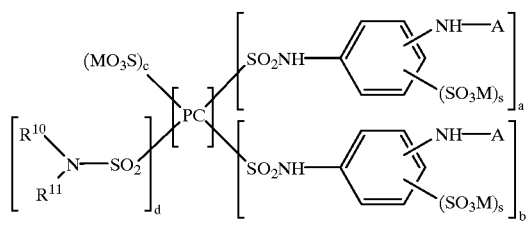

(44)

where

M, A, R, p, r and S are each as defined above,

PC is the radical of a copper or nickel phthalocyanine, $R^{10}$ is hydrogen or alkyl of 1 to 4 carbon atoms, which may be substituted, for example by halogen, such as chlorine and bromine, hydroxy, carboxy, sulfo and sulfato, $R^{11}$ is hydrogen or alkyl of 1 to 4 carbon atoms, which may be substituted, for example by halogen, such as chlorine and bromine, hydroxy, carboxy, sulfo and sulfato, a is 1 or 2, b is 1 or 2, c is zero, 1 or 2, and d is zero or 1, provided the sum (a+b+c+d) is not more than 4 and the sum (a+b) is not less than 2, furthermore the dyes of the general formulae (45) to (48)

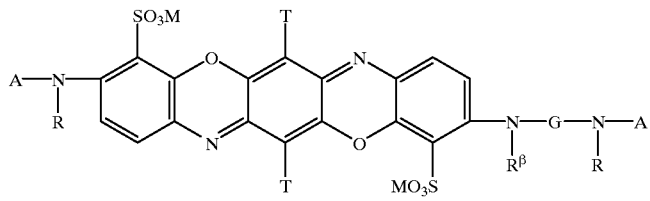

(45)

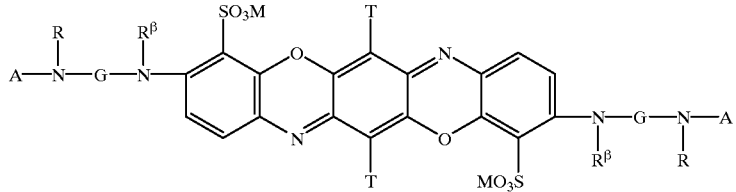

(46)

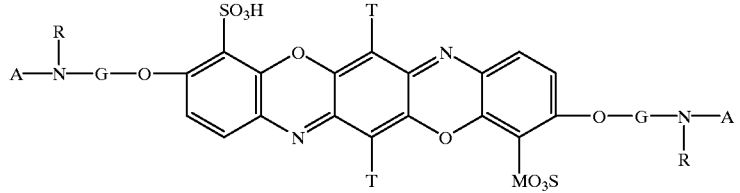

(47)

(48)

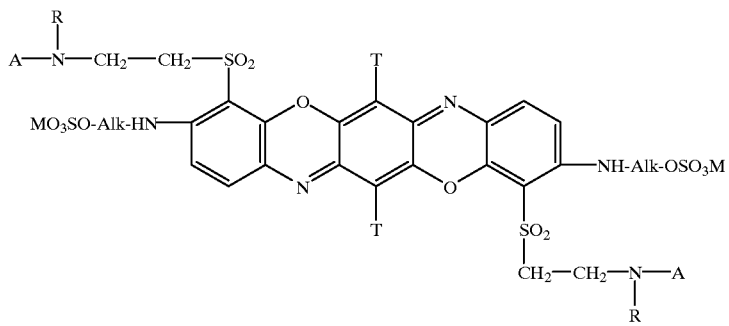

where

A, R, R^β, and M are each as defined above, each T is chlorine, bromine or methoxy, preferably chlorine, G is an aliphatic bridge member, for example alkylene of 2 to 6 carbon atoms, preferably 2 to 4 carbon atoms, or alkylene of 3 to 8 carbon atoms which is interrupted by 1 or 2 hetero groups, for example —NH—, —O—, —NH—CO— or —CO—NH—, and Alk is alkylene of 1 to 4 carbon atoms.

Diazo components having the benzene nucleus E are for example 1,3-phenylene-4-sulfonic acid, 1,4-phenylenediamine-2-sulfonic acid, 1,4-phenylenediamine-2,5-disulfonic acid and 1,3-phenylenediaminedisulfonic acid. The radical $R^4$ in the formula (10) is especially hydrogen, methyl or ethyl.

In the dyes of the formulae (10) to (48), one A is preferably a radical of the general formula (3)

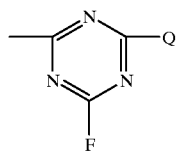

(3)

where

Q is amino, morpholino, N-β-hydroxyethylamino, N,N-di-β-hydroxy-ethylamino, β-sulfoethylamino or phenylamino which may be substituted in the phenyl nucleus, for example by substituents selected from the group consisting of chlorine, methyl, ethyl, methoxy, ethoxy, acetylamino, hydroxy, carboxy, sulfomethyl and sulfo, or is N-($C_1$-$C_4$-alkyl)-N-phenylamino which may be substituted in the phenyl nucleus, for example by substituents selected from the group consisting of chlorine, methyl and ethyl, or is N-sulfo-($C_1$-$C_4$-alkyl)-N-phenylamino which may be substituted in the phenyl nucleus, for example by substituents selected from the group consisting of chlorine, methyl and ethyl, or is N-hydroxy-$C_1$-$C_4$-alkyl-N-phenylamino or sulfonaphthylamino, and the second reactive radical A is 5,6-difluoropyrimid-4-yl.

Dyes of this kind are for example dyes of the general formula (49)

(49)

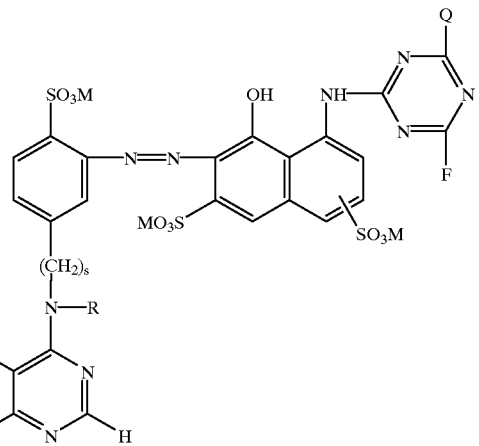

where M, R, Q and s are each as defined above.

Preference is given to dyes (10) to (48) in which each A is X, and similarly to those in which one A is X and the other is a radical of the abovementioned general formula (2a).

The present invention further provides a process for preparing the dyes (1) by reacting a compound of the general formula (5)

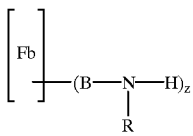

(5)

where Fb, B, R and n are each as defined above and z is 2 or 3, or the corresponding dye intermediates, with 1 to 2 mol of the compound 4,5,6-trifluoropyrimidine and optionally with 1 to 2 mol of a compound of the general formula (6)

Z–Hal (6)

where Hal is chlorine, bromine or fluorine and Z is as defined above, and, if intermediates are used, these are subsequently converted into the desired final dyes and optionally subjected to further conversion reactions.

To prepare the preferred azo dyes, the diazo components and the coupling components together must contain two amino groups —N(R)H and optionally further acylatable amino groups. If desired, appropriate acetylamino or nitro compounds are used and, prior to the condensation with a halotriazine, halopyrimidine or the like, the acetylamino or nitro group is converted into an $NH_2$ group by hydrolysis or reduction, respectively. The reactive radicals X and Z are introduced by the condensation of dyes, or dye intermediates which contain acylatable amino groups, with fiber-reactive halogenated acylating agents. The reactions to prepare the final dyes from intermediates are usually coupling reactions leading to azo dyes.

Since the individual process steps specified above can be carried out in various orders, various versions of the process are possible. In general, the reactions are carried out in successive steps, the order of the elementary reactions within the individual reaction components advantageously depending on the particular conditions. Since, under certain preconditions, a halotriazine or halopyrimidine radical will hydrolyze, an intermediate which contains acetylamino groups has to be hydrolyzed to eliminate the acetyl groups before condensation with an aminodifluorotriazine or trifluorotriazine etc. Possible further conversion reactions include, for example, the subsequent reaction of a dihalotriazinyl radical with an amine. Which reaction is judiciously carried out first when preparing a secondary condensation product of the formula $HNR^1R^2$ where $R^1$ and $R^2$ are each as defined above, 2,4,6-trihalo-s-triazine and diaminobenzenesulfonic acid, that of the trihalotriazine with the amine or with the diaminobenzenesulfonic acid, will vary from case to case and depends especially on the solubility of the amino compounds involved and on the basicity of the amino groups to be acylated. The most important versions of the process are exemplified in the illustrative embodiments.

Suitable starting compounds for preparing the mono- or polyazo dyes of the formula (1) according to the present invention are for example:

as diazo components (D, $D^1$ and $D^2$):

1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminophenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxyilc acid, 1,3-diaminobenzene-4-carboxylic acid, 1,2-diaminobenzene-4carboxylic acid, 1,3-diaminobenzene-5-carboxylic acid, 1,4-diaminobenzene-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4-diaminostilbene-2,2'-disulfonic acid, 2-amino-5-aminomethyinaphthalene-1-sulfonic acid, 2-amino-5-aminomethylnaphthalene-1,7-disulfonic acid and 1-amino-4-methoxy-5-aminomethylbenzene-6-sulfonic acid;

if the diazo component to be used is not a diamine but an aminoacetylamino compound from which the acetyl group is subsequently reeliminated by hydrolysis, as described above in the explanations of the versions of the process, the monoacetyl compounds of the above-mentioned diazo components are suitable, for example 1-acetylamino-3-aminobenzene-4-sulfonic acid and 1-acetylamino-4-aminobenzene-3-sulfonic acid;

as coupling components K:

1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzyl, 1,3-diaminobenzene-4-sulfonic acid, 1-aminonaphthalene- 6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethyl-amino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethyl-amino-8-hydroxy-naphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- and -4,6-disulfonic acid, 1-(4'-aminobenzoylamino)-8-hydroxynaphthalene-3, 6- and -4,6-disulfonic acid, 1-(4'-nitrobenzoylamino)-8-hydroxynaphthalene-3, 6- and -4,6-disulfonic acid, 1-(3'-aminobenzoylamino)-8-hydroxynaphthalene-3,6- and -4,6-disulfonic acid, 1-(3'-nitrobenzoylamino)-8-hydroxynaphthalene-3,6- and -4,6-disulfonic acid, 2-(4'-amino-3'-sulfophenylamino)-5- hydroxynaphthalene-7-sulfonic acid, 1-amino-8-hydroxy-naphthalene-4-sulfonic acid, 2,4,6-triamino-3-cyanopyridine, 1-β-aminoethyl-3-cyano-4-methyl-6-hydroxypyrid-2-one, 1-γ-aminopropyl-3-sulfomethyl-4-methyl-6-hydroxypyrid-2-one and 1,3-diaminobenzene.

If the two radicals —B—N(R)—X and —B—N(R)—Z in the formula (1) are attached to the same component, for example the coupling component, as described above, then it is also possible to use diazo components which, besides the amino group to be diazotized, contain no acylatable amino group, for example aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2, 5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid, 1-aminobenzene-2,4- and -2, 5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2, 5,7-trisulfonic acid, 2-aminonaphthalene-1,5,7-, -3,6,8- or -4,6,8-trisulfonic acid, 4-aminobenzene-3,4'-disulfonic acid and 3-methoxy-4-amino-6-methylazobenzene-2',5'-disulfonic acid.

The diazo components, or the intermediates containing a diazotizable amino group, are generally diazotized in a conventional manner for this reaction by the action of nitrous acid in aqueous mineral acid solution at low temperature. The coupling onto the coupling component likewise takes place in a conventional manner at strongly acidic or weakly acidic to weakly alkaline pH, depending on the type of coupling component.

The condensation of the reactive components with the diazo components and the coupling components and with the amines or with acylatable monoazo or disazo intermediates or with the amino-containing dyes is preferably effected in aqueous solution or suspension at low temperature and at weakly acidic, neutral pH. Advantageously, the hydrogen halide liberated in the course of the condensation is continuously neutralized by addition of aqueous alkali metal hydroxides, carbonates or bicarbonates.

The dyes of the present invention are very useful for dyeing and printing natural and synthetic hydroxy- and/or amido-containing materials, especially those composed of cellulose and polyamides. They are particularly useful for dyeing cellulose materials by exhaust and cold pad-batch processes and for printing cotton and viscose rayon. The dyeings are obtained with good build-up capacity and high yields of fixation and have good all round fastness properties, especially wetfastnesses.

The Examples which follow illustrate the invention. Parts and percentages are by weight, unless otherwise stated. Parts by weight relate to parts by volume as the kilogram to the liter.

The compounds described in the Examples in terms of their formulae are reported in the form of the free acid; in general, they are prepared and isolated in the form of their alkali metal salts, such as lithium, sodium or potassium salts, and used for dyeing in the form of their salts. Similarly, the starting compounds and components mentioned in the Examples which follow, especially Table Examples, in the form of the free acid can be used in the synthesis as such or in the form of their salts, preferably alkali metal salts.

The absorption maxima ($\lambda_{max}$) in the visible region reported for the dyes of the present invention were determined on aqueous solutions of their alkali metal salts. In the Table Examples, the $\lambda_{max}$ values are set in parentheses next to the reported hue; the reported wavelength is in nm.

Dyeing Method 1

2 parts of the dye are dissolved in 100 parts of water. The solution is added to 1900 parts of cold water, 60 of sodium chloride are added, and this dyebath is entered with 100 parts of a cotton fabric. The temperature is raised to 60° C., and after 30 minutes 40 parts of anhydrous sodium carbonate and a further 60 parts of sodium chloride are added. The temperature is maintained at 60° C. for 30 minutes, then the dyeing is rinsed and soaped off in a 0.3% strength boiling solution of a nonionic detergent for 15 minutes, rinsed again and dried.

Dyeing Method 2

4 parts of the dye are dissolved in 50 parts of water. 50 parts are added of a solution comprising 5 g of sodium hydroxide and 10 g of anhydrous sodium carbonate per liter. The solution used is used to pad a cotton fabric with a wet pick-up of 70% of its weight, and the padded fabric is then wound up on a roller and left at room temperature for 3 to 12 hours. Thereafter the dyed material is rinsed, soaped off in a boiling aqueous bath comprising a nonionic detergent for 15 minutes, rinsed once more and dried.

EXAMPLE 1 a) 0.2 mol of 1-amino-8-hydroxynaphthalene-3,6-disulfonic acid is dissolved in 350 ml of water at pH 6.5 and cooled down to 0° C. with 350 g of ice. 0.21 mol of 2,4,6-trifluoro-1,3,5-triazine (cyanuric fluoride) is added, and the pH is maintained between 3.5 and 4 using Na$_2$CO$_3$ solution. After 5 minutes, 0.2 mol of morpholine is added, and the pH is adjusted to 7 with sodium carbonate solution; the temperature rises to about 10° C.

b) 0.2 mol of 5,6-difluoro-4-(3'-amino-4'-sulfophenyl) pyrimidine (prepared from 2,4-diaminobenzenesulfonic acid and 2,4,6-trifluoropyrimidine) is suspended in water and admixed with 65 ml of 30% strength hydrochloric acid and 300 g of ice. Thereafter 46 ml of 30% strength sodium nitrite solution are added, and the batch is stirred at 0° C. for one hour. Excess sodium nitrite is destroyed with amidosulfonic acid. The resulting diazonium salt suspension is added to the solution of the coupling component prepared as per a). A pH of 6 to 7 is set with sodium carbonate solution. After the coupling has ended, the dye is salted out, isolated, dried and ground. It has the formula (written in the form of the free acid)

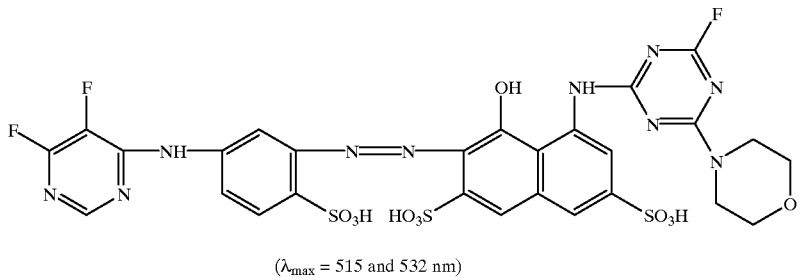

(λ<sub>max</sub> = 515 and 532 nm)

and dyes cotton in bright red shades.

EXAMPLE 2 a) 0.2 mol of 1,4-diaminobenzene-2,5-disulfonic acid is dissolved in 500 ml of water using concentrated sodium hydroxide solution under neutral conditions. The solution is heated to 50° C. and 0.3 mol of 4,5,6-trifluoropyrimidine is added. A pH of 7 is maintained by simultaneous addition of sodium carbonate solution (20 g/ 100 ml). The reaction ends after 3 hours. The batch is cooled down to 0° C. and 55 ml of 30% strength HCl are added. Over 30 minutes, 47 ml of sodium nitrite solution are added dropwise at 0 to 5° C. at a rate of 30 g/100 ml, and the batch is subsequently stirred at 0 to 5° C. for 30 minutes. Excess nitrite is then destroyed with amidosulfonic acid. b) 0.2 mol of 6-amino-1-naphthol-3-sulfonic acid is dissolved in 600 ml of water at pH 7 to 7.5 in the presence of 38 ml of 11% strength lithium hydroxide solution. 0.21 mol of cyanuric fluoride is added dropwise over 30 minutes while a pH of 3.7 to 4.1 is maintained by simultaneous dropwise addition of 11% strength lithium hydroxide solution. The batch is subsequently stirred for 5 minutes and 0.2 mol of morpholine is added. This sodium carbonate solution (20 g/100 ml) is used to set a pH of 7, the batch is subsequently stirred at from 5 to 8° C. for 15 minutes, and the diazonium salt suspension prepared under a) is added dropwise over an hour. 1M sodium bicarbonate solution is used to maintain a pH of 5.5 to 6.5. After the coupling has ended, the dye is salted out with NaCl, isolated and dried. It has the formula (written in the form of the free acid)

and dyes cotton in red shades.

EXAMPLE 3

0.2 mol of 1-amino-8-hydroxynaphthalene-3,6-disulfonic acid is dissolved in 450 ml of water at pH 8 to 9 using sodium hydroxide solution and admixed with 0.22 mol of 4,5,6-trifluoropyrimidine. The condensation takes place at 35 to 40° C. while the pH is maintained with sodium carbonate solution.

Coupling with the diazonium salt suspension described in Example 1 under the same conditions affords, after salting out, isolating and drying, the dye of the formula (written in the form of the free acid)

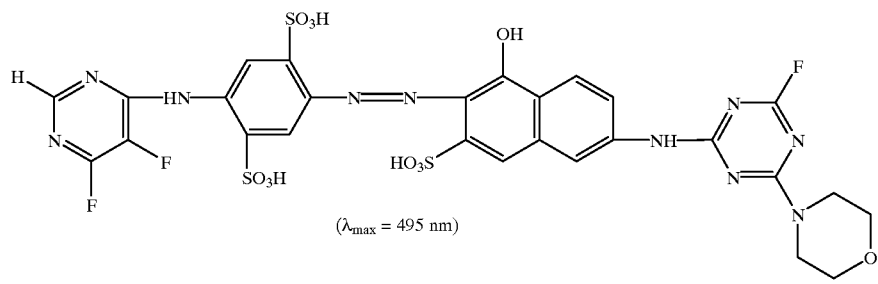

(λ<sub>max</sub> = 495 nm)

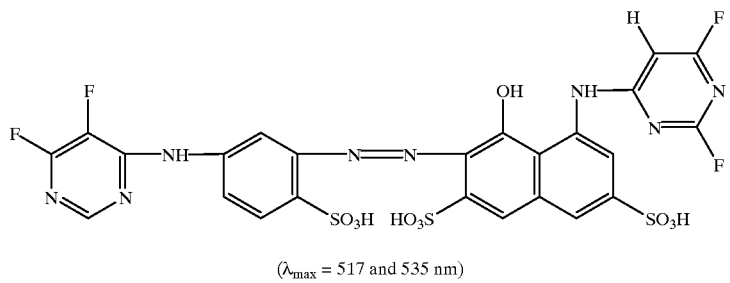

($\lambda_{max}$ = 517 and 535 nm)

which dyes cotton in red shades.

EXAMPLE 4

0.2 mol of 8-(4'-aminobenzoylamino)-1-naphthol-3,6-disulfonic acid is dissolved in 800 ml of water at pH 7 using sodium carbonate solution (20 g/100 ml). pH 4.5 is set with 10% strength HCl solution. 2.2 mol of 4,5,6-trifluoropyrimidine is added, and the batch is heated to 30° C. and maintained at pH 4.5 to 6 using sodium carbonate solution (20 g/100 ml). The reaction ends after 4 hours.

0.2 mol of the diazonium salt of Example 1 is then added while at the same time a pH of 7.5 to 8 is maintained by dropwise addition of sodium carbonate solution (20 g/100 ml). After the coupling has ended, the dye is salted out with NaCl, isolated and dried. It has the formula (written in the form of the free acid)

solution under neutral conditions. 250 g of ice are added, followed by 0.27 mol of cyanuric fluoride added dropwise, a pH of 4 to 5 is maintained with 1M sodium bicarbonate solution, and the batch is subsequently stirred for about 10 minutes.

b) 0.2 mol of 8-(4'-aminobenzoylamino)-1-naphthol-3,6-disulfonic acid is suspended in 300 ml of water and dissolved with 11% strength lithium hydroxide solution under neutral conditions. This solution is added to the solution prepared under a) while the pH is maintained between 6.5 and 7 using sodium carbonate solution; the temperature rises to about 10° C. After the reaction has ended, 0.2 mol of the diazonium salt of Example 1 is added while at the same time

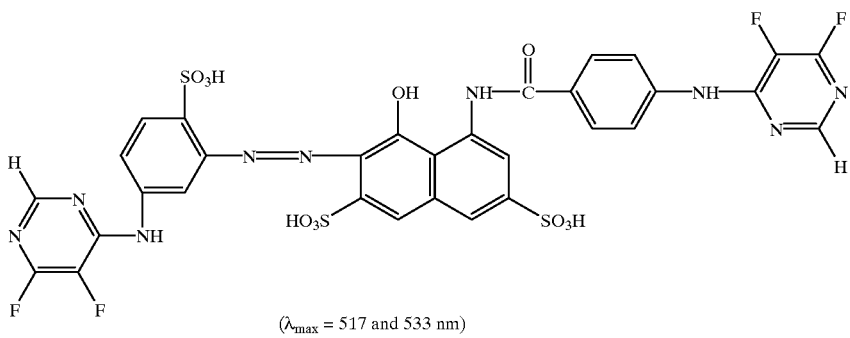

($\lambda_{max}$ = 517 and 533 nm)

and dyes cotton in red shades.

EXAMPLE 5 a) 0.26 mol of 3-(β-sulfatoethyl)sulfonylaniline are dissolved in 250 ml of water with 1M sodium bicarbonate a pH of 7.5 to 8 is maintained by dropwise addition of sodium carbonate solution (20 g/100 ml). After 3 hours, the dye of the present invention is salted out with NaCl and isolated. Written in the form of the free acid, it has the formula

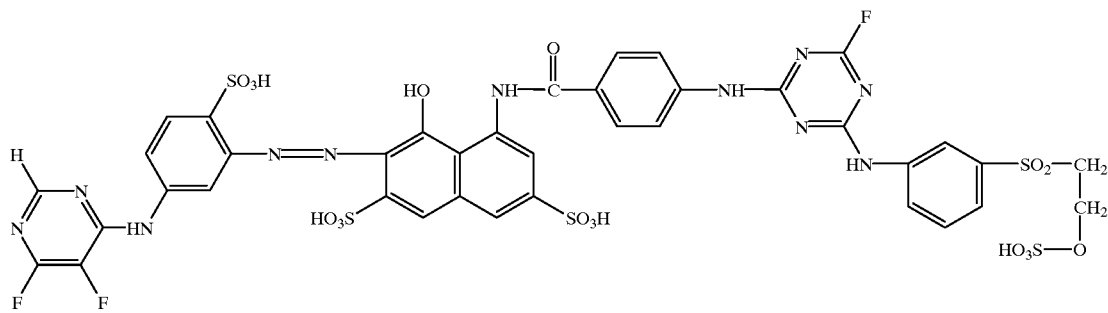

and dyes cotton in red shades.

EXAMPLE 6 a) 0.2 mol of 2-amino-4-(aminomethyl)benzenesulfonic acid is dissolved in 500 ml of water at pH 8 using concentrated sodium hydroxide solution. 4,5,6-Trifluoropyrimidine is added, and the reaction is carried out at pH 8 to 8.5 and 30 to 40° C. by simultaneous addition of 11% strength lithium hydroxide solution. Thereafter the batch is cooled down to 0° C., 56 ml of 30% strength hydrochloric acid are added, followed by 47 ml of sodium nitrite solution (30 g/100 ml) added dropwise at 0 to 5° C. over an hour, and the batch is subsequently stirred at 0 to 5° C. for one hour. The excess nitrite is then destroyed by addition of amidosulfonic acid.

b) 0.2 mol of 1-amino-8-hydroxynaphthalene-4,6-disulfonic acid is dissolved in 300 ml of water at pH 5 to 7 by addition of concentrated sodium hydroxide solution. 300 g of ice are added, and 0.21 mol of cyanuric chloride is sprinkled in. Sodium carbonate solution (20 g/100 ml) is used to maintain a pH of 4 to 4.5 at 0° C. After the condensation has ended, 0.2 mol of a neutral solution of 4-chloroaniline in about 200 ml of water is added, the batch is heated to 20 to 30° C., and the pH is maintained at 6 to 7 with sodium carbonate sollution (20 g/100 ml). After about 1 hour, the batch is cooled down to 10° C., and the diazonium salt solution prepared under a) is added at a pH maintained at 7 to 7.5.

After the coupling has ended, the dye is salted out with NaCl, isolated and dried. Written in the form of the free acid, it has the formula and dyes cotton in red shades.

EXAMPLES 7 to 99

The Table Examples which follow describe further novel dyes conforming to the general formula (1A)

$$X-D-N=N-K-Z \qquad (1A)$$

in terms of their components; they can be prepared in the manner of the present invention, for example similarly to one of the above Examples, using the components evident from the respective Table Example, and dye cotton in the recited hues.

In the formula (1A), X is 5,6-difluoropyrimidin-4-yl.

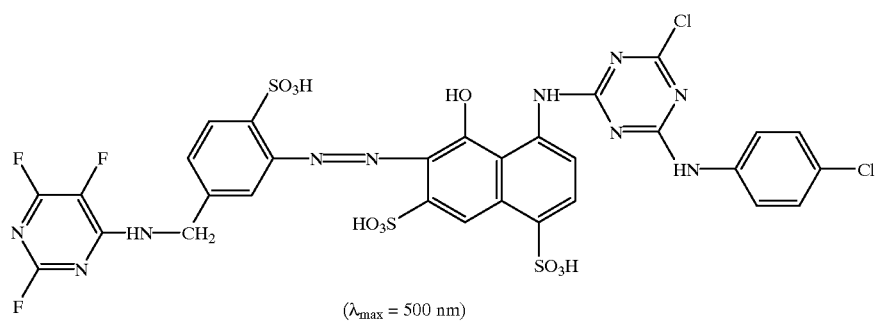

($\lambda_{max}$ = 500 nm)

| Ex. | X-D- | -K-Z | Z | Hue |
|---|---|---|---|---|
| 7 | (4-methyl-3-sulfophenyl)-NH-X | 8-amino-1-hydroxy-3-methyl-naphthalene-4,6-disulfonic acid coupler (NH-Z) | 4-fluoro-6-methyl-2-(3-sulfophenylamino)-1,3,5-triazine | bluish red |
| 8 | (2-methyl-4-sulfophenyl)-NH-X | 4-[(8-amino-1-hydroxy-3-methyl-4,6-disulfonaphthalen-5-yl)carbonylamino]phenyl-NH-Z | 4-fluoro-6-methyl-2-(3-sulfophenylamino)-1,3,5-triazine | red |
| 9 | 5-(X-N(CH₃)CH₂)-6-methylnaphthalene-1-sulfonic acid | " | " | yellowish red |
| 10 | (4-methyl-3-sulfophenyl)-NH-X | 8-amino-1-hydroxy-3-methyl-naphthalene-4,6-disulfonic acid coupler (NH-Z) | 4-fluoro-6-methyl-2-(N-ethyl-N-phenylamino)-1,3,5-triazine | bluish red |

| Ex. | X-D- | -K-Z | Z | Hue |
|---|---|---|---|---|
| 11 | 2-methyl-4-(NH-X)-benzenesulfonic acid (SO₃H on ring) | " | 4-fluoro-6-methyl-2-(morpholin-4-yl)pyrimidine | red |
| 12 | 5-(X-NH-CH₂)-1-sulfo-7-methylnaphthalene | " | 4-fluoro-6-methyl-2-[N(CH₂CH₂SO₃H)]pyrimidine | red |
| 13 | 3-sulfo-4-methyl-(X-HN)-benzene | " | 4-fluoro-6-methyl-2-(piperidin-1-yl)pyrimidine | reddish violet |
| 14 | 4-SO₃H-3-methyl-(X-NH)-benzene | " | 4-fluoro-6-methyl-2-[N(CH₃)(CH₂CH₂CN)]pyrimidine | red |

-continued

| Ex. | X-D- | -K-Z | Z | Hue |
|---|---|---|---|---|
| 15 | " | naphthalene with OH, NH-Z, HO₃S, SO₃H substituents | 4-fluoro-6-methylpyrimidin-2-yl with N(phenyl)(CH₂-CH₂-OH) | red |
| 16 | " | " | 4-fluoro-6-methylpyrimidin-2-yl with N(4-chlorophenyl)(C₂H₅) | red (514; sh 530) |
| 17 | tolyl-SO₃H with CH₂-N(CH₃)-X | " | 4-fluoro-6-methylpyrimidin-2-yl with N(phenyl)(C₂H₅) | red (512; 535) |
| 18 | tolyl-SO₃H with X-HN- | " | 4-fluoro-6-methylpyrimidin-2-yl with NH-(naphthyl-SO₃H) | reddish violet |

-continued

| Ex. | X-D- | -K-Z | Z | Hue |
|---|---|---|---|---|
| 19 | 4-methylphenyl-CH₂-SO₂-CH₂-NH-X | " | 4-fluoro-6-methylpyrimidin-2-yl with N(C₂H₅)(phenyl) | red |
| 20 | 2-methyl-5-SO₃H-naphthalen-8-yl-CH₂-NH-X | 4-amino(Z)-8-hydroxy-7-methyl-naphthalene-1,6-disulfonic acid (NH-Z, OH, SO₃H, HO₃S) | 4-fluoro-6-methylpyrimidin-2-yl-NH-(3-SO₃H-phenyl) | bluish red |
| 21 | 2-methyl-5-SO₃H-naphthalen-8-yl-SO₂CH₂CH₂-NH-X | " | 4-fluoro-6-methylpyrimidin-2-yl with N(C₂H₅)(phenyl) | red |
| 22 | 3-methyl-4-SO₃H-phenyl-NH-X | 4-amino(Z)-8-hydroxy-7-methyl-naphthalene-2,6-disulfonic acid (NH-Z, OH, SO₃H, HO₃S) | 4-fluoro-6-methylpyrimidin-2-yl-NH-(CH₂)₂-O-(CH₂)₂-SO₂-CH=CH₂ | rot (514, 532) |

-continued

| Ex. | X-D- | -K-Z | Z | Hue |
|---|---|---|---|---|
| 23 | 3-SO₃H-4-CH₃-phenyl-NH-X | | 4-fluoro-6-methyl-2-morpholino-1,3,5-triazine | reddish violet |
| 24 | 5-SO₃H-8-methyl-naphthyl-CH₂-N(CH₃)-X | " | " | red (514, 533) |
| 25 | 3-CH₃-4-SO₃H-phenyl-CH₂-N(CH₃)-X | 1-hydroxy-2-methyl-3-SO₃H-6-(NH-Z)-naphthyl | " | orange |
| 26 | 3-SO₃H-4-CH₃-phenyl-NH-X | " | " | scarlet |

| Ex. | X—D— | -K-Z | Z | Hue |
|---|---|---|---|---|
| 27 | 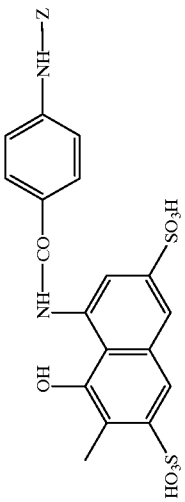 | 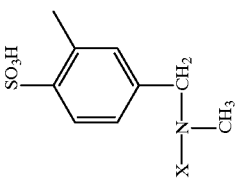 | " | red (512; 535) |
| 28 | 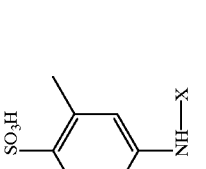 | " | 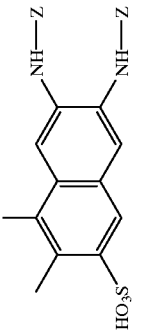 | red (512; 535) |
| 29 | | | | orange |
| 30 | " | | | reddish scarlet (506) |

-continued
| Ex. | X-D- | -K-Z | Z | Hue |
|---|---|---|---|---|
| 31 | " | 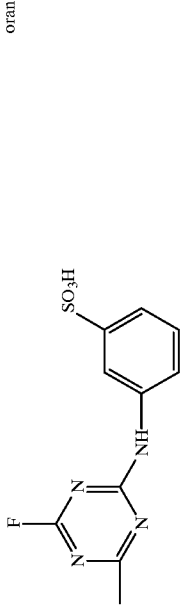 | 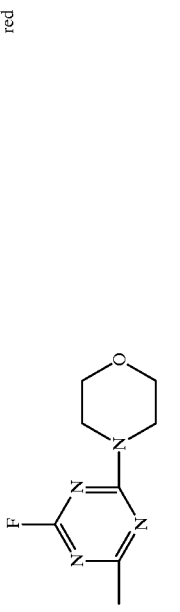 | orange |
| 32 |  |  | " | red |
| 33 |  | " | " | red |
| 34 | | | | red |
| 35 | | | | reddish violet |

-continued

| Ex. | X-D- | -K-Z | Z | Hue |
|---|---|---|---|---|
| 36 | SO₃H-C₆H₃(CH₃)-CH₂-N(CH₃)-X | " | " | red |
| 37 | naphthalene(SO₃H)(CH₃)-CH₂-NH-X | " | " | bluish red |
| 38 | SO₃H-C₆H₃(CH₃)-CH₂-N(CH₃)-X | 8-amino-1-hydroxy-7-methyl-naphthalene-3,5-disulfonic acid coupled with Z at NH | " | red |
| 39 | naphthalene(SO₃H)(CH₃)-CH₂-NH-X | " | " | red |

-continued

| Ex. | X-D- | -K-Z | Z | Hue |
|---|---|---|---|---|
| 40 | 3-amino-4,6-disulfo-toluene (X-NH-, SO₃H, CH₃, SO₃H) | " | " | bluish red |
| 41 | 4-amino-2-methyl-benzenesulfonic acid derivative | " | " | red |
| 42 | X-NH-, SO₃H, CH₃ substituted benzene | structure: naphthalene with OH, CH₃, SO₃H, NH-Z | " | scarlet |
| 43 | X-N(CH₃)-CH₂- substituted methyl-sulfo-benzene | " | " | orange |

-continued

| Ex. | X-D- | -K-Z | Z | Hue |
|---|---|---|---|---|
| 44 | 3-amino-4,6-disulfo-toluene (X-NH-, SO₃H, SO₃H, CH₃) | " | " | red |
| 45 | 4-amino-2-methyl-benzenesulfonic acid (X-NH-, SO₃H, CH₃) | " | " | orange |
| 46 | " | 7-(N-methyl-Z-amino)-1-hydroxy-2-methyl-3-sulfonaphthalene | 2,6-difluoro-5-chloro-4-methylpyrimidine | orange |
| 47 | 5-amino-2-methyl-benzenesulfonic acid (X-NH-, SO₃H, CH₃) | 4-[(Z-amino)phenyl-CO-NH]-8-hydroxy-7-methyl-naphthalene-3,6-disulfonic acid derivative | 5-fluoro-4-chloropyrimidine | bluish red |

-continued

| Ex. | X-D- | -K-Z | Z | Hue |
|---|---|---|---|---|
| 48 | (structure: SO₃H and methyl on benzene ring, X—N(CH₃)—CH₂—) | " | " | red |
| 49 | (structure: naphthalene with SO₃H and methyl, X—HN—CH₂—) | " | (pyrimidine with F, F, Cl, CH₃) | red |
| 50 | (structure: benzene with two SO₃H and methyl, X—NH—) | " | (pyrimidine with F, Cl, CH₃) | bluish red |
| 51 | (structure: benzene with SO₃H and methyl, X—NH—) | " | " | red |

-continued

| Ex. | X-D- | -K-Z | Z | Hue |
|---|---|---|---|---|
| 52 | CH₂—CH₂—SO₂-C₆H₄-CH₃ with NH—X | 8-amino-1-hydroxy-methyl-naphthalene-3,6-disulfonic acid (NH—Z, OH, SO₃H, HO₃S, CH₃) | " | red |
| 53 | 4-methyl-3-sulfophenyl-NH—X | " | 5-chloro-2,4-difluoro-6-methylpyrimidine | reddish violet |
| 54 | 3-methyl-4-sulfophenyl-CH₂—N(X)— | " | " | red |
| 55 | naphthyl-CH₂—NH—X (SO₃H, CH₃) | " | " | bluish red |
| 56 | 3-methyl-4-sulfophenyl-CH₂—N(CH₃)—X | 8-amino-1-hydroxy-methyl-naphthalene-4,6-disulfonic acid (NH—Z, OH, SO₃H, HO₃S, CH₃) | " | red |

-continued

| Ex. | X-D- | -K-Z | Z | Hue |
|---|---|---|---|---|
| 57 | (naphthalene with SO₃H, CH₃, X—HN—CH₂ substituents) | " | " | red |
| 58 | (benzene with SO₃H, CH₃, SO₃H, X—NH substituents) | " | " | bluish red |
| 59 | (benzene with SO₃H, CH₃, X—NH substituents) | " | " | red |
| 60 | (benzene with SO₃H, CH₃, X—NH substituents) | " | " | scarlet |
| 61 | (benzene with SO₃H, CH₃, X—N—CH₂ substituents) | (naphthalene with OH, CH₃, HO₃S, NH—Z substituents) | " | orange |

-continued
| Ex. | X-D- | -K-Z | Z | Hue |
|---|---|---|---|---|
| 62 | 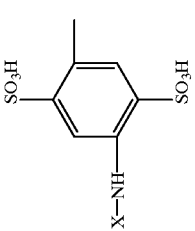 | " | " | red |
| 63 | 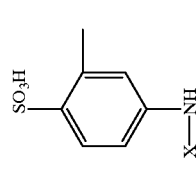 | " | " | orange |
| 64 | 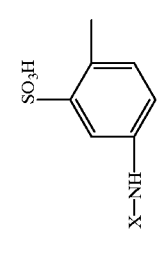 | 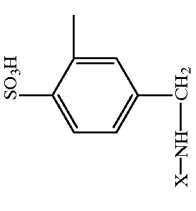 | " | bluish red |
| 65 |  | " | " | red |

-continued

| Ex. | X-D- | -K-Z | Z | Hue |
|---|---|---|---|---|
| 66 | 3-amino-4,6-disulfo-toluene (X-NH on ring with SO₃H, CH₃, SO₃H) | " | " | bluish red |
| 67 | 4-sulfo-3-methyl-aniline (X-NH-, SO₃H, CH₃) | 8-amino-1-hydroxy-7-methyl-3,6-disulfo-naphthalene with NH-CO-C₆H₄-NH-Z substituent | " | red |
| 68 | H₃C-C₆H₄-SO₂-CH₂-CH₂-NH-X | 8-amino-1-hydroxy-7-methyl-3,6-disulfo-naphthalene with NH-Z | " | red |
| 69 | 4-methyl-3-sulfo (X-NH-, CH₃, SO₃H) | 6-amino-1-hydroxy-2-methyl-3-sulfo-naphthalene with NH-Z | " | scarlet |
| 70 | X-(3-methyl-4-sulfo-phenyl)-CH₂-N(CH₃)- | " | 2-[3-(β-sulfatoethylsulfonyl)phenylamino]-4-fluoro-6-methyl-triazine (F, N, N, N, CH₃, NH-C₆H₄-SO₂-CH₂-CH₂-OSO₃H) | orange |

-continued

| Ex. | X-D- | -K-Z | Z | Hue |
|---|---|---|---|---|
| 71 | 2-methyl-4-amino benzenesulfonic acid (X—NH, SO₃H, CH₃) | 8-amino-1-hydroxy-2-methyl-naphthalene-3,6-disulfonic acid (HO₃S, HO, NH—Z, SO₃H, CH₃) | 4-(4-fluoro-6-methyl-pyrimidin-2-ylamino)phenyl-SO₂—CH=CH₂ | red (515, 535) |
| 72 | " | " | 3-(4-fluoro-6-methyl-pyrimidin-2-ylamino)phenyl-SO₂—CH₂—CH₂—OSO₃H | red |
| 73 | 3-methyl-4-sulfo-N-methyl-benzylamine | " | " | red |
| 74 | " | " | 4-(4-fluoro-6-methyl-pyrimidin-2-ylamino)phenyl-SO₂—CH₂—CH₂—O—SO₃H | red |

-continued

| Ex. | X-D- | -K-Z | Z | Hue |
|---|---|---|---|---|
| 75 | naphthalene with SO₃H, CH₃, and X—NH—CH₂ substituents | " | 2-methyl-4-fluoro-pyrimidin-6-yl—NH—(3-phenyl)—SO₂—CH₂—CH₂—OSO₃H | red |
| 76 | " | " | 2-methyl-4-fluoro-pyrimidin-6-yl—NH—(4-phenyl)—SO₂—CH₂—CH₂—OSO₃H | bluish red |
| 77 | benzene with SO₃H, CH₃, X—NH | naphthalene with NH—CO—(4-phenyl)—NH—Z, OH, CH₃, 2× SO₃H | | red |
| 78 | benzene with SO₃H, CH₃, X—N(CH₃)—CH₂ | " | 2-methyl-4-fluoro-pyrimidin-6-yl—NH—(3-phenyl)—SO₂—CH₂—CH₂—OSO₃H | red |

| Ex. | X-D- | -K-Z | Z | Hue |
|---|---|---|---|---|
| 79 | 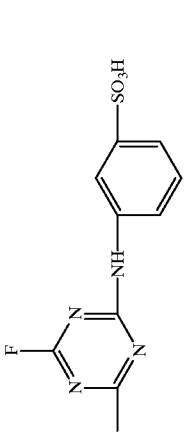 | 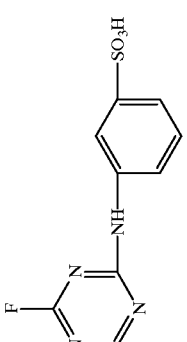 | 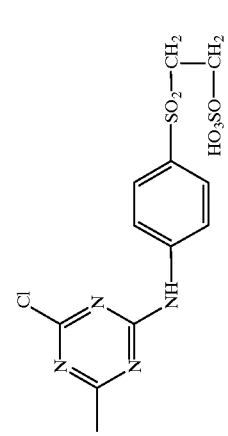 | red |
| 80 | 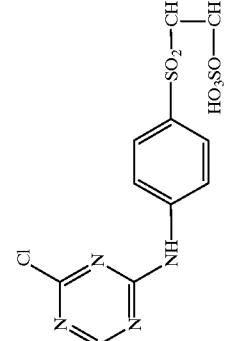 |  |  | yellowish red |
| 81 |  | " | " | yellowish red |
| 82 |  | " | " | red |

-continued

| Ex. | X-D- | -K-Z | Z | Hue |
|---|---|---|---|---|
| 83 | 4-sulfo-3-methylphenyl-NH-X | " | 6-chloro-2-methyl-4-(3-sulfophenylamino)-1,3,5-triazinyl | yellowish red |
| 84 | 8-hydroxy-5-sulfo-7-methyl-4-(CH$_2$-NH-X)-naphthalene | 8-amino-1-hydroxy-2-methyl-3,6-disulfo-5-(NH-Z)-naphthalene (K-Z with NH-Z at 5, HO at 1, SO$_3$H at 6, CH$_2$ linker) | " | red |
| 85 | 4-sulfo-3-methyl-8-(CH$_2$-N(CH$_3$)-X)-naphthalene | " | " | yellowish red |
| 86 | 4-sulfo-3-methylphenyl-NH-X | 8-amino-1-hydroxy-2-methyl-3,6-disulfo-5-(NH-Z)-naphthalene | 6-chloro-2-methyl-4-[4-(β-sulfatoethylsulfonyl)phenylamino]-1,3,5-triazinyl | red |

-continued

| Ex. | X-D- | -K-Z | Z | Hue |
|---|---|---|---|---|
| 87 | ![structure: 4-SO3H, 3-methyl phenyl-CH2-N(CH3)-X] | " | " | red |
| 88 | ![structure: naphthalene with SO3H and CH3, X-NH-CH2-] | " | ![chlorotriazine with methyl and NH-phenyl-SO2-CH2-CH2-OSO3H] | bluish red |
| 89 | ![structure: 4-SO3H, 3-methyl phenyl-NH-X] | " | " | red |
| 90 | " | " | ![chlorotriazine with methyl and NH-CH2-CH2-SO3H] | red |

-continued

| Ex. | X-D- | -K-Z | Z | Hue |
|---|---|---|---|---|
| 91 | naphthalene with SO₃H, CH₃, X—NH—CH₂ substituents | " | chloro-methyl-triazine-NH-phenyl-SO₂-CH₂-CH₂-OSO₃H | red |
| 92 | naphthalene with SO₃H, CH₃, X—NH—CH₂ substituents | " | chloro-methyl-triazine-NH-(2,5-disulfophenyl) | bluish red |
| 93 | benzene with SO₃H, CH₃, X—NH substituents | —NH— phenyl —CO—NH— naphthalene (OH, SO₃H, SO₃H, CH₃) —N= | chloro-methyl-triazine-N(CH₃)-CH₂-CH₂-SO₃H | red |
| 94 | naphthalene with SO₃H, CH₃, X—NH—CH₂ substituents | " | chloro-methyl-triazine-morpholino | red |

-continued
| Ex. | X-D- | -K-Z | Z | Hue |
|---|---|---|---|---|
| 95 | | | | scarlet |
| 96 | | | " | scarlet |
| 97 | | | | orange |
| 98 | | | | orange |
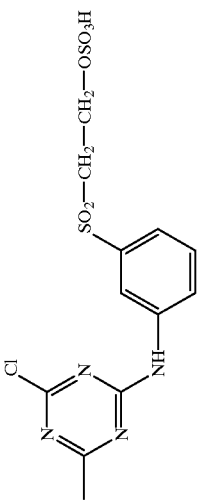

-continued
| Ex. | X-D- | -K-Z | Z | Hue |
|---|---|---|---|---|
| 99 | 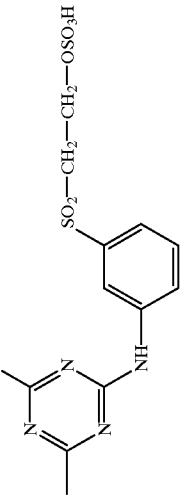 | " | (structure: 4-chloro-6-methyl-1,3,5-triazin-2-yl-NH-phenyl-SO₂—CH₂—CH₂—OSO₃H) | orange |

EXAMPLE 100

0.2 mol of 1-amino-8-hydroxynaphthalene-3,6-disulfonic acid is dissolved in 650 ml of water at pH 6.5. The solution is heated to 35° C. and admixed with 0.2 mol of 2,3-dichloroquinoxaline-6-carbonyl chloride; a pH of 6 to 7 is set with sodium carbonate solution, and the reaction is carried out at 35° C. for about 6 hours. Thereafter a coupling reaction is carried out with the 5,6-difluoro-4-(3'-amino-4'-sulfophenylamino)pyrimidine diazonium salt similarly to Example 1.

The dye is salted out, isolated, dried and ground. Written in the form of the free acid, it has the formula

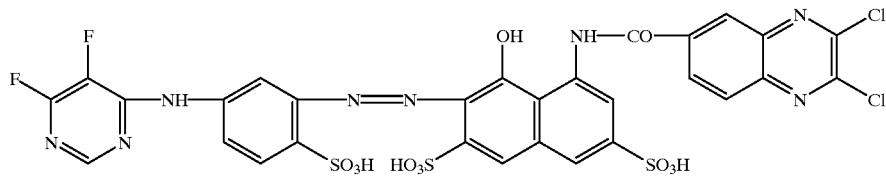

($\lambda_{max}$ = 518 and 533 nm)

and dyes cotton in red shades.

EXAMPLES 101 to 111

The Table Examples which follow describe further novel dyes conforming to the general fromula (1B)

$$X-D-N=N-K-Z^1 \tag{1B}$$

in terms of their components; they can be prepared in a similar manner using the components evident from the respective Table Example, and dye cotton in the recited hues.

In the formula (1B), X is 5,6-difluoropyrimidin-4-yl and $Z^1$ is 2,3-dichloroquinoxaline-6-carbonyl.

| Ex. | X-D- | -K-$Z^1$ | Hue |
|---|---|---|---|
| 101 | (SO$_3$H, X—NH-phenyl-CH$_3$) | (OH, NH—$Z^1$, CH$_3$, HO$_3$S, SO$_3$H-naphthyl) | bluish red |
| 102 | (SO$_3$H, X—N(CH$_3$)—CH$_2$-phenyl-CH$_3$) | " | red |
| 103 | (SO$_3$H, X—HN-phenyl-SO$_3$H, CH$_3$) | " | bluish red |

-continued
| Ex. | X-D- | -K-Z¹ | Hue |
|---|---|---|---|
| 104 | 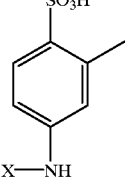 | " | ed |
| 105 | 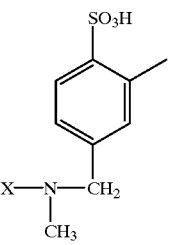 | 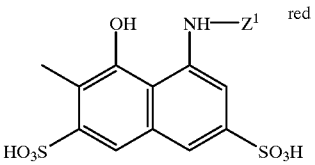 | red |
| 106 | 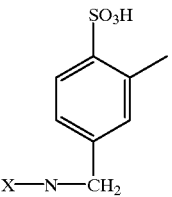 | " | bluish red |
| 107 | 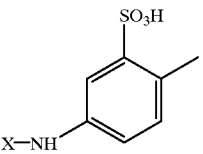 | " | reddish violet |
| 108 | 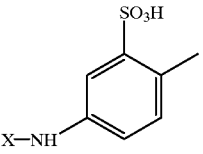 | 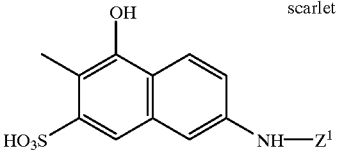 | scarlet |
| 109 | 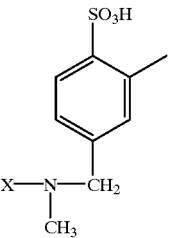 | " | orange |
| 110 | 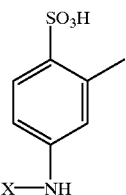 | " | orange |

-continued

| Ex. | X-D- | -K-Z¹ | Hue |
|---|---|---|---|
| 111 | " | (structure) | orange |

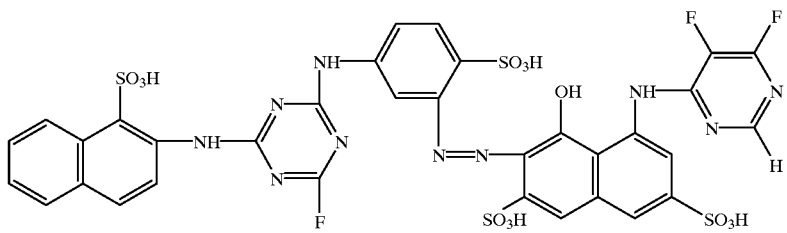

EXAMPLE 112

A neutral solution of 0.2 mol of the lithium salt of 2-aminonaphthalene-1-sulfonic acid and 530 g of ice-water is admixed with 0.21 mol of cyanuric fluoride while the pH is maintained at 4 with sodium carbonate solution. The resulting suspension is admixed with a neutral aqueous solution of 0.2 mol of 2,4-diaminobenzenesulfonic acid and the pH is raised to 7 to 7.5. The batch is warmed to 20° C. and stirred for about 1 hour, then cooled down to 0° C., and the resulting reaction product is diazotized with HCl and sodium nitrite solution at pH 2 to 2.2. After the excess nitrite has been destroyed with amidosulfonic acid, a coupling is carried out onto the coupling component described in Example 3 at pH 7 to 8 and 10 to 15° C. Salting out, isolating and drying affords the dye of the formula (written in the form of the free acid)

($\lambda_{max}$ = 513 u. 530 nm)

which dyes cotton in red shades.

EXAMPLES 113 to 124

The Table Examples which follow describe further novel dyes conforming to the general formula (1A)

$$X-D-N=N-K-Z \quad (1A);$$

they can be prepared in a similar manner using the recited diazo and coupling components and amines. They dye cotton in the recited hues.

In the formula (1 A), X is 5,6-difluoropyrimidin-4-yl.

| Ex. | Z-D- | -K-X | Z | Hue |
|---|---|---|---|---|
| 113 | 3-sulfo-4-methylphenyl-NH-Z | 8-amino-1-hydroxy-3,6-disulfo-7-methylnaphthalene (NH-X) | 4-fluoro-6-methyl-2-morpholino-pyrimidinyl | reddish violet |
| 114 | 4-sulfo-3-methylphenyl-CH₂-N(CH₃)-Z | " | " | red |
| 115 | 2-methyl-1-sulfonaphthalen-5-yl-CH₂-NH-Z | " | 4-fluoro-6-methyl-2-(3-sulfophenylamino)-pyrimidinyl | bluish red |
| 116 | 4-methyl-3,5-disulfophenyl-NH-Z | 8-amino-1-hydroxy-3,6-disulfo-7-methylnaphthalene (NH-X) | 4-fluoro-6-methyl-2-(N-ethyl-N-phenylamino)-pyrimidinyl | bluish red |

-continued

| Ex. | Z-D- | -K-X | Z | Hue |
|---|---|---|---|---|
| 117 | | | | red |
| 118 | | | | red |
| 119 | | | | red |
| 120 | | | | reddish violet |

| Ex. | Z-D- | -K-X | Z | Hue |
|---|---|---|---|---|
| 121 | 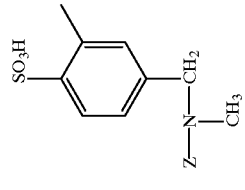 | " | " | red |
| 122 | 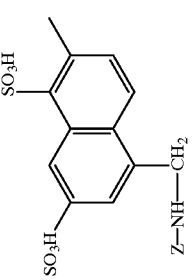 | 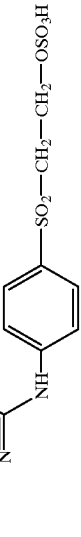 | " | bluish red |
| 123 | 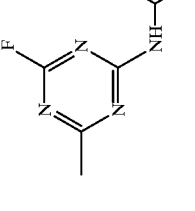 | 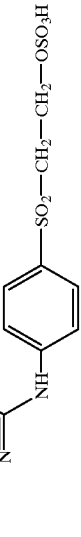 | 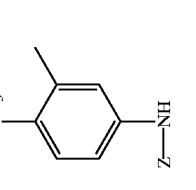 | red |
| 124 | " | " | 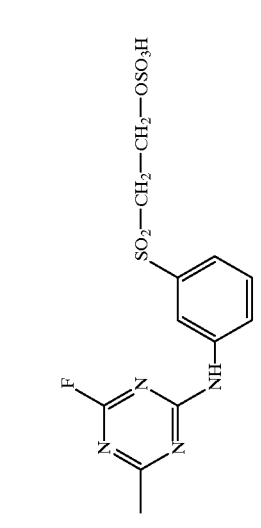 | red |

EXAMPLE 125

0.24 mol of cyanuric chloride is sprinkled into a neutral solution of 0.22 mol of N-ethylaniline in 400 g of ice-water and a pH of 6 to 7 is maintained with sodium carbonate solution (20 g/100 ml). After about an hour at 0° C., the condensation ends. 0.2 mol of 2,4-diaminobenzenesulfonic acid, dissolved in 250 ml of water by addition of concentrated sodium nitrite solution, is added while a pH of 6 to 7 is maintained with sodium carbonate solution (20 g/100 ml). The batch is warmed to 25 to 35° C. After the condensation has ended, it is cooled down to 0° C., 56 ml of 30% strength hydrochloric acid is added, 47 ml of sodium nitrite solution (30 g/100 ml) are added dropwise, and the batch is subsequently stirred at 0° C. for one hour.

Sodium nitrite is destroyed with amidosulfonic acid, and the resulting diazonium salt solution is added to the coupling component of Example 3; the coupling reaction takes place at a pH of 7 to 8 and at 10 to 15° C. After the coupling has ended, the dye is salted out with NaCl, isolated and dried. It has the formula

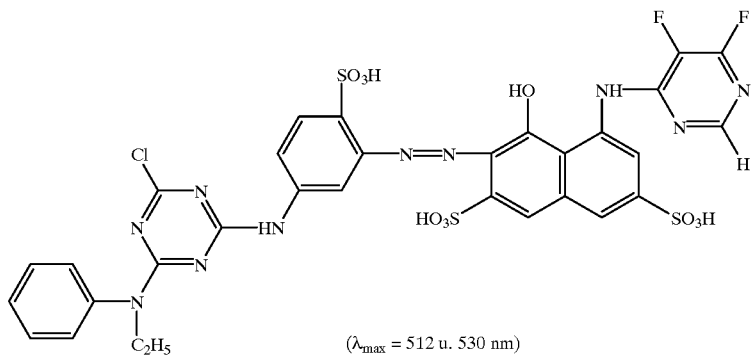

($\lambda_{max}$ = 512 u. 530 nm)

and dyes cotton in red shades.

EXAMPLES 126 to 131

The Table Examples which follow describe further novel dyes conforming to the general formula (1B)

$$Z-D-N=N-K-X \quad (1B);$$

they can be prepared in a similar manner using the recited diazo and coupling components and amines. They dye cotton in the recited hues.

In the formula (1B), X is 5,6-difluoropyrimidin-4-yl.

| Ex. | Z-D- | -K-X | Z | Hue |
|---|---|---|---|---|
| 126 | [2-methyl-4,5-disulfophenyl with Z-NH] | [1-hydroxy-8-amino(NH-X)-naphthalene-3,6-disulfonic acid, 2-methyl] | [4-chloro-6-methyl-2-(4-chlorophenylamino)-1,3,5-triazinyl] | reddish brown |
| 127 | [2-methyl-4-sulfo-5-(Z-NH-CH(OCH₃))phenyl] | " | [4-chloro-6-methyl-2-(N-methyl-N-phenylamino)-1,3,5-triazinyl] | bluish red |
| 128 | [5-(Z-NH-CH₂)-8-sulfo-3-methyl-naphthalenyl] | " | [4-chloro-6-methyl-2-(3-(SO₂-CH₂-CH₂-OSO₃H)phenylamino)-1,3,5-triazinyl] | bluish red |
| 129 | [2-methyl-3-sulfo-4-(Z-NH)phenyl] | [1-hydroxy-8-(4-(NH-X)phenyl-CO-NH)naphthalene-3,6-disulfonic acid, 2-methyl] | " | red |

-continued

| Ex. | Z-D- | -K-X | Z | Hue |
|---|---|---|---|---|
| 130 | (structure: benzene ring with SO₃H, CH₃, and Z—N(CH₃)—CH₂— substituents) | " | " | red |
| 131 | " | (naphthalene structure with OH, HO₃S, CH₃, and NH—X substituents) | " | orange |

EXAMPLES 132 to 143

The Table Examples which follow describe further novel dyes conforming to the general formula (1C)

$$A^1-D-N=N-K-A^2 \qquad (1C);$$

they can be prepared in a similar manner using the recited diazo and coupling components and amines. They dye cotton in the recited hues.

| Ex. | A¹ | A¹—D— | —K—A² | A² | Hue |
|---|---|---|---|---|---|
| 132 | pyrimidine (H, F, F, CH₃) | 3-methyl-4-sulfophenyl-NH— | 4-methyl-3-(acetylamino)phenyl-NH—A² | 6-fluoro-2-methyl-4-morpholino-pyrimidine | golden yellow |
| 133 | 4-(3-sulfoanilino)-6-methyl-pyrimidine-F | 8-sulfo-2-methyl-5-(CH₂-NH-A¹)-naphthalene | " | 4-fluoro-6-methyl-5-fluoro-pyrimidine (NH) | golden yellow |
| 134 | 2,3-dichloro-6-methoxy-quinoxaline | 4,8-disulfo-3-amino-6-(NH-A¹)-naphthalene | 4-methyl-3-(carbamoylamino)phenyl-NH—A² | " | reddish yellow |
| 135 | pyrimidine (H, F, F, CH₃) | " | 4-methyl-3-(acetylamino)phenyl-NH—A² | 6-fluoro-2-methyl-4-[3-(SO₂CH₂CH₂OSO₃H)anilino]-pyrimidine | reddish yellow |

-continued

| Ex. | A¹ | A¹-D- | -K-A²- | A² | Hue |
|---|---|---|---|---|---|
| 136 | " | " | (4-amino-5-hydroxy-6-methylnaphthalene-2,7-disulfonic acid with NH-A²) | 4-fluoro-6-methyl-2-(N-ethyl-N-phenylamino)pyrimidine | bluish red |
| 137 | (3-sulfophenylamino-fluoromethylpyrimidine) | " | (6-amino-1-hydroxy-2-methylnaphthalene-3-sulfonic acid) | 2,3-difluoro-5-methylpyrazine | orange |
| 138 | " | (naphthalene bisazo with 4-methyl-3-sulfophenyl, SO₃H, HO₃S, A¹-NH) | (4-amino-5-hydroxy-6-methylnaphthalene-2,7-disulfonic acid with NH-A²) | 4-fluoro-6-methyl-2-[N-methyl-N-(2-sulfoethyl)amino]pyrimidine | violet |
| 139 | " | " | (pyridone: CH₃, CH₂SO₃H, O, N-CH₂-CH₂-NH-A², HO, CH₃) | " | yellow |

| Ex. | A¹ | A¹-D- | -K-A² | A² | Hue |
|---|---|---|---|---|---|
| 140 | " | 4-methylphenyl-SO₂-CH₂-CH₂-SO₂-NH-A¹ | 4-methyl-3-(NH-CO-CH₃)-phenyl-NH-A² | | golden yellow |
| 141 | 6-methyl-5-chloro-4-fluoropyrimidin-2-yl | 1-SO₃H-7-methyl-6-(SO₂-CH₂-CH₂-NH-A¹)-naphthyl | " | 6-methyl-4,5-difluoropyrimidin-2-yl | golden yellow |
| 142 | 6-methyl-4,5-difluoropyrimidin-2-yl | " | " | 6-methyl-5-chloro-4-fluoropyrimidin-2-yl | golden yellow |
| 143 | " | " | " | 6-methyl-4,5-difluoropyrimidin-2-yl | golden yellow |

EXAMPLES 144 to 167

The above-described methods of preparation, or customary methods, can be used to convert the correspondingstarting compounds into further novel dyes of the Examples which follow.

| Ex. | Dye of formula (1) | Hue |
|---|---|---|
| 144 | | yellowish brown |
| 145 | | red |
| 146 | | navy to black |
| 147 | | red |

-continued

| Ex. | Dye of formula (1) | Hue |
|---|---|---|
| 148 | (structure) | red |
| 149 | (structure) | navy to black |
| 150 | (structure) | navy to black |

| Ex. | Dye of formula (1) | Hue |
|---|---|---|
| 151 | 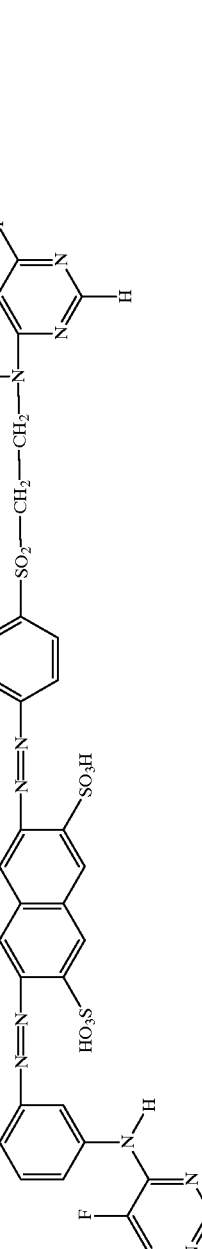 | navy |
| 152 | 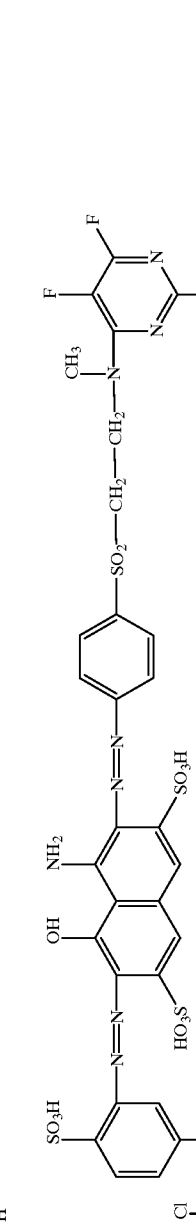 | navy |
| 153 | 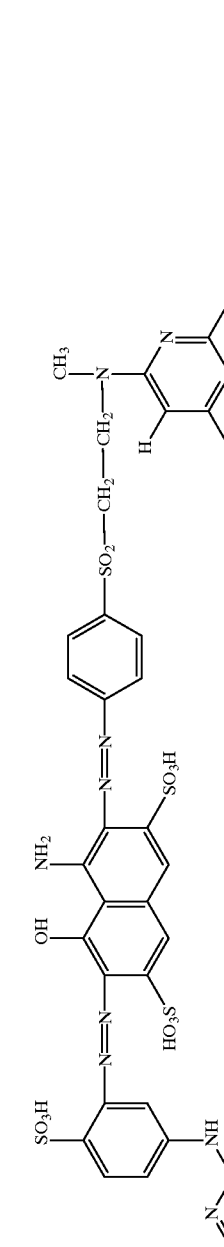 | navy |

-continued
| Ex. | Dye of formula (1) | Hue |
|---|---|---|
| 154 | 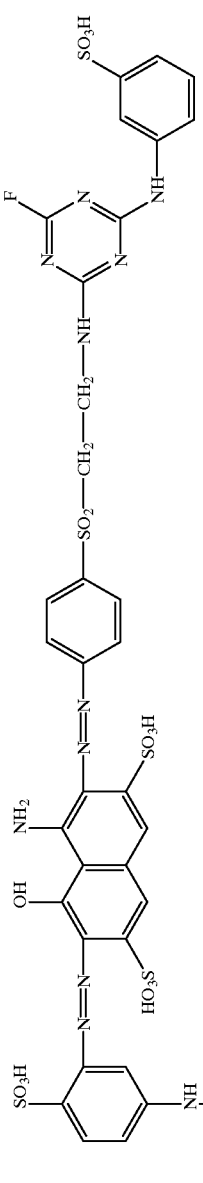 | navy |
| 155 | 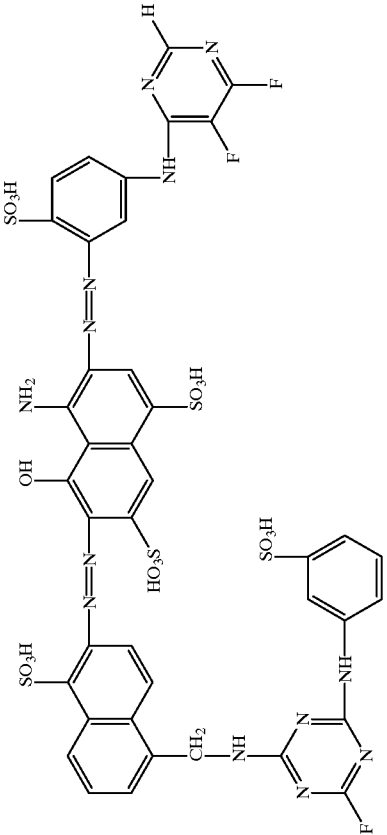 | navy to black |

-continued

| Ex. | Dye of formula (1) | Hue |
|---|---|---|
| 156 | | black |
| 157 | | navy to black |
| 158 | | navy or black |

| Ex. | Dye of formula (1) | Hue |
|---|---|---|
| 159 | | navy or black |
| 160 | | brown |
| 161 | | brown |

-continued
| Ex. | Dye of formula (1) | Hue |
|---|---|---|
| 162 | 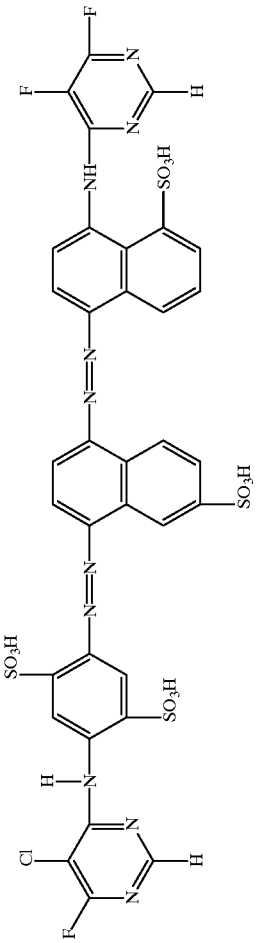 | brown |
| 163 | 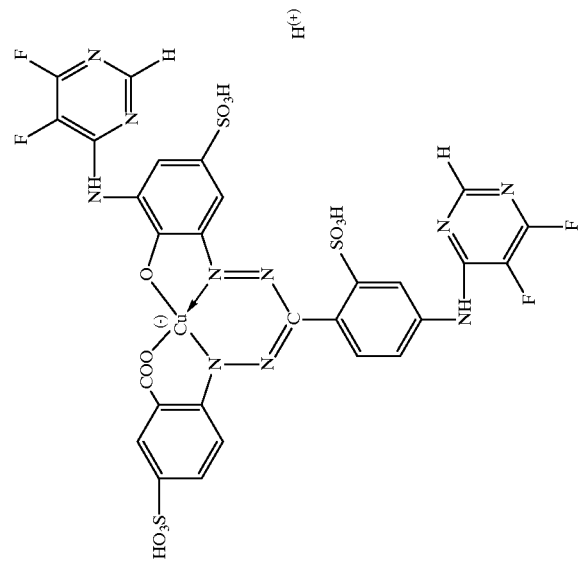 | blue |

-continued

| Ex. | Dye of formula (1) | Hue |
|---|---|---|
| 164 | | blue |
| 165 | | blue |
| 166 | | blue |

-continued
| Ex. | Dye of formula (1) | Hue |
|---|---|---|
| 167 | 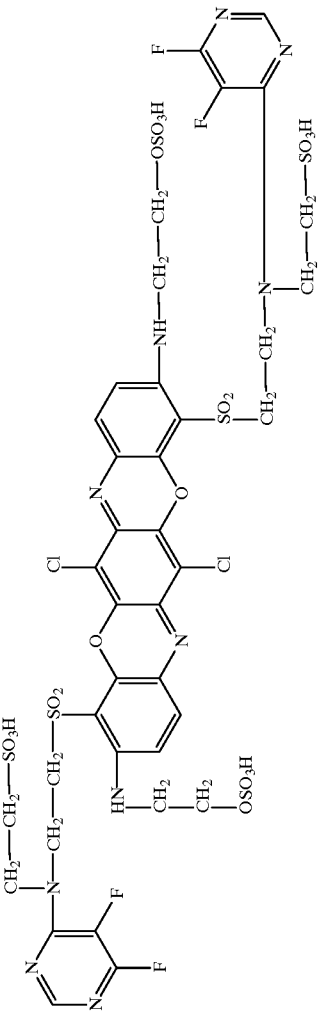 | blue |

What is claimed is:

1. A dye which is at least one of the following:

a monoazo dye conforming to the formula (1a) or (1b)

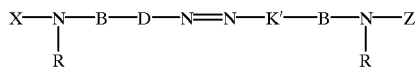
(1a)

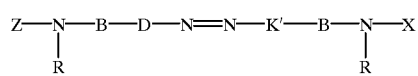
(1b)

in which

R is each, independently of the other one, hydrogen or alkyl of 1 to 6 carbon atoms, unsubstituted or substituted, X is the 5,6-difluoro-pyrimidin-4-yl group, Z has the meaning of X or is another heterocyclic fiber-reactive radical, B is each, independently of the other one, a bridge member which is bonded to a ring carbon atom of an aromatic carbocyclic radical or to a ring carbon or nitrogen atom of an aromatic heterocyclic radical of D or K', D are each the aromatic radical of a diazo component, said aromatic radical being optionally substituted benzene or naphthalene, and K' is the optionally substituted benzene, naphthalene, acetoacetarylide or heterocyclic radical of a coupling component;

a monoazo dye conforming to said formula (1a) or (1b), except that B is a direct covalent bond rather than a said bridge member, in which case Z is the 5,6-difluoro-pyrimidin-4-yl group or is a group of the formula (2)

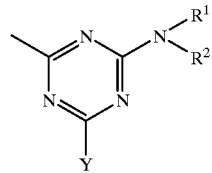
(2)

where $R^1$ and $R^2$ are each, independently of the other, hydrogen; $C_1$–$C_4$-alkyl, optionally substituted; benzyl; phenethyl; cyclohexyl; phenyl; a group of the formula —$CH_2$—$CH_2$—$SO_2$—W, where W is vinyl or a group of the formula —$cH_2$—$CH_2$—V, where V is an alkali-eliminable substituent; phenyl, optionally substituted; or naphthyl, optionally substituted;

or —$NR^1R^2$ is morpholino, piperidino or piperazino, and Y is fluorine;

or a dye conforming to the general formula (1)

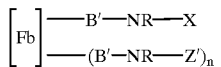
(1)

where

Fb is the radical of a dis-, tris- or polyazo dye, of a 1:1 copper, 1:2 chromium or 1:2 cobalt complex mono-, dis- or trisazo dye, of an anthraquinone, phthalocyanine, metal phthalocyanine, formazan, azomethine, dioxazine, triphendioxazine, phenazine, stilbene, triphenylmethane, xanthene, thioxanthone, nitroaryl, naphthoquinone, pyrenequinone or perylenetetracarbimide dye;

B' is each, independently of the other one, a direct covalent bond or a bridge member which is bonded to a ring carbon atom of an aromatic carbocyclic radical or to a ring carbon or nitrogen atom of an aromatic heterocyclic radical of Fb;

R and X are as defined previously,

Z' is a heterocyclic fiber-reactive radical, and n is 1 or 2.

2. A dye as claimed in claim 1, wherein the dye conforms to said formula (1a) or (1b).

3. A dye as claimed in claim 1, conforming to the general formula (10) or (11)

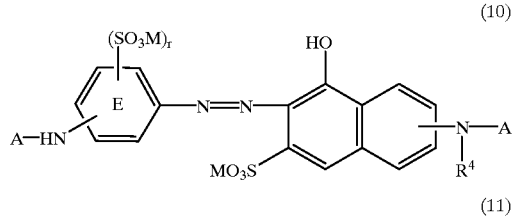
(10)

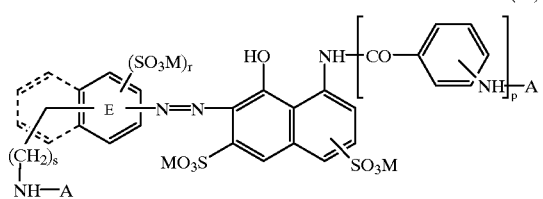
(11)

where

M is hydrogen or an alkali metal, each A is X or one A is X and the other A is Z, or Z' X' Z' and Z each being as defined in claim 1, $R^4$ is hydrogen, methyl or ethyl, the benzene ring E is optionally substituted by further substituents, r is 1 or 2, s is zero or 1, and p is zero or 1.

4. A dye as claimed in claim 1, conforming to the general formula (12)

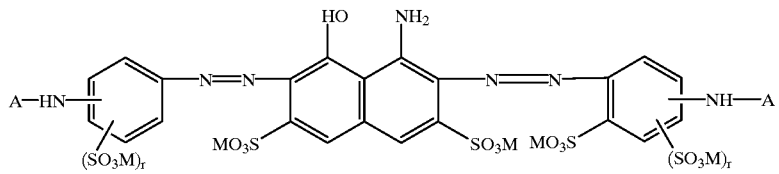

where

M is hydrogen or an alkali metal, each A is X or one A is X and the other A is Z, X and Z each being as defined in claim 1, and each r, which is identical to or different from the others, is 1 or 2.

5. A dye as claimed in claim 1, wherein Z is a group of the general formula (2)

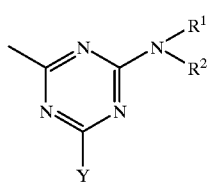

(2)

where $R^1$ and $R^2$ are each independently of the other hydrogen or $C_1$–$C_4$-alkyl, unsubstituted or substituted, or is benzyl, phenethyl, cyclohexyl, phenyl or a group of the formula —$CH_2$—$CH_2$—$SO_2$—W, where W is vinyl or a group of the formula —$CH_2$—$CH_2$—V, where V is an alkali-eliminable substituent, or is phenyl unsubstituted or substituted, or is naphthyl unsubstituted or substituted, or —$NR^1R^2$ is morpholino, piperidino or piperazino, and Y is chlorine, fluorine or a substituted or unsubstituted pyridinium.

6. A dye as claimed in claim 1, wherein Z is 5,6-difluoropyrimidin-4-yl.

7. A dye as claimed in claim 1, wherein —B—N(R)—Z is a group of the general formula (2a)

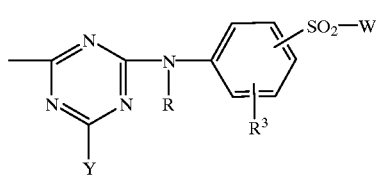

(2a)

where

Y is chlorine, fluorine, pyridinium or substituted pyridinium,

W is vinyl or a group of the formula —$CH_2$—$CH_2$—V, where V is an alkali-eliminable substituent, and $R^3$ is hydrogen, chlorine, bromine, alkyl of 1 to 4 carbon atoms, alkoxy of 1 to 4 carbon atoms, carboxy or sulfo.

8. A dye as claimed in claim 1, wherein B is a direct covalent bond.

9. A dye as claimed in claim 1, wherein B is a group of the formula (a) to (l)

 (a)

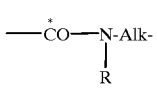 (b)

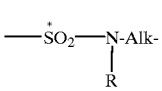 (c)

 (d)

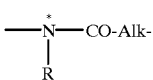 (e)

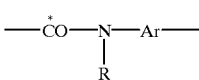 (f)

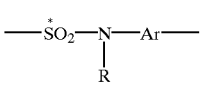 (g)

 (h)

 (i)

 (j)

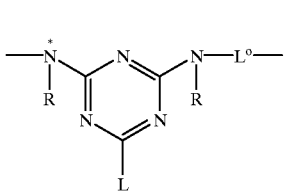 (k)

 (l)

where the asterisk marks the site of attachment to Fb,

R is as defined in claim 1,

Alk is alkylene of 1 to 6 carbon atoms or alkylene of 2 to 8 carbon atoms which is interrupted by 1 or 2 hetero groups or by 1 or 2 groupings containing 1, 2 or 3 hetero groups, Ar is phenylene or naphthylene or the radical of a biphenyl or stilbene, Ar being unsubstituted or substituted in the aromatic nuclei, L° has the meaning of Alk or Ar or is a grouping of the formula -Alk-Arwhere Alk and Ar are each as defined above, and L is fluorine, chlorine, bromine, amino unsubstituted or substituted, hydroxy, alkoxy of 1 to 4 carbon atoms, phenoxy unsubstituted or substituted, or ($C_1$–$C_4$-alkyl) thio.

10. A dye as claimed in claim 1, wherein R is methyl, ethyl or hydrogen.

11. A dye as claimed in claim 1, wherein R is hydrogen.

12. A dye as claimed in claim 1, wherein n is 1.

13. A dye as claimed in claim 7, wherein W is vinyl or β-sulfatoethyl.

14. A dye as claimed in claim 5, wherein Y is fluorine.

15. A dye as claimed in claim 7, wherein Y is fluorine.

16. A dye as claimed in claim 3, wherein one A is a group of the general formula (3)

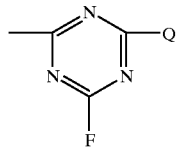

(3)

where

Q is amino, morpholino, N-β-hydroxyethylamino, N,N-di-β-hydroxyethylamino, β-sulfoethylamino or phenylamino unsubstituted or substituted in the phenyl, or is N-($C_1$–$C_4$-alkyl)-N-phenylamino unsubstituted or substituted in the phenyl, or is N-sulfo-($C_1$–$C_4$-alkyl)-N-phenylamino unsubstituted or substituted in the phenyl, or is N-hydroxy-$C_1$–$C_4$-alkyl-N-phenylamino or sulfonaphthylamino, and the second reactive radical A is 5,6-difluoropyrimid-4-yl.

17. A dye as claimed in claim 4, wherein one A is a group of the general formula (3)

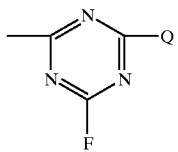

(3)

where

Q is amino, morpholino, N-β-hydroxyethylamino, N,N-di-β-hydroxyethylamino, β-sulfoethylamino or phenylamino unsubstituted or substituted in the phenyl, or is N-($C_1$–$C_4$-alkyl)-N-phenylamino unsubstituted or substituted in the phenyl, or is N-sulfo-($C_1$–$C_4$-alkyl)-N-phenylamino unsubstituted or substituted in the phenyl, or is N-hydroxy-$C_1$–$C_4$-alkyl-N-phenylamino or sulfonaphthylamino, and the second reactive radical A is 5,6-difluoropyrimid-4-yl.

18. A dye as claimed in claim 1, conforming to the general formula (49)

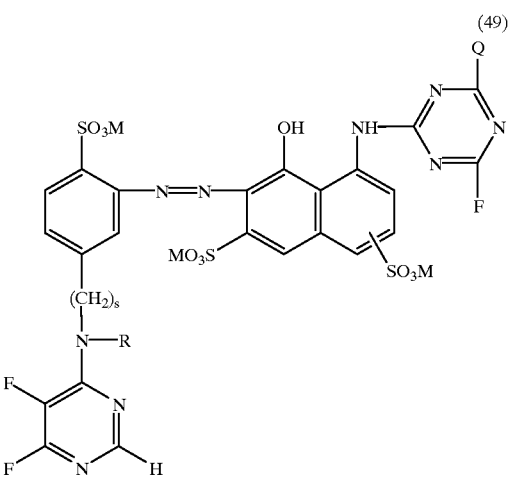

(49)

where

M is hydrogen or an alkali metal, s is zero or 1,

R is hydrogen, methyl or ethyl, and

Q is amino, morpholino, N-β-hydroxyethylamino, N,N-di-β-hydroxyethylamino, β-sulfoethylamino or phenylamino unsubstituted or substituted in the phenyl, or is N-($C_1$–$C_4$-alkyl)-N-phenylamino unsubstituted or substituted in the phenyl, or is N-sulfo-($C_1$–$C_4$-alkyl)-N-phenylamino unsubstituted or substituted in the phenyl, or is N-hydroxy-$C_1$–$C_4$-alkyl-N-phenylamino or sulfonaphthylamino.

\* \* \* \* \*